US012809359B2

(12) United States Patent
Luo et al.

(10) Patent No.: US 12,809,359 B2
(45) Date of Patent: Nov. 24, 2026

(54) SYSTEMS AND METHODS FOR ANOMALY DETECTION IN INDUSTRIAL BATCH ANALYTICS

(71) Applicant: ROCKWELL AUTOMATION TECHNOLOGIES, INC., Mayfield Heights, OH (US)

(72) Inventors: Dennis J. Luo, Germantown, WI (US); Justice Darko, Greensboro, NC (US); Meiling He, Shorewood, WI (US); Jay W. Schiele, Union Grove, WI (US); Fatime Ly Seymour, Mocksville, NC (US); Francisco P. Maturana, Lyndhurst, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 398 days.

(21) Appl. No.: 18/308,234

(22) Filed: Apr. 27, 2023

(65) Prior Publication Data

US 2024/0361757 A1 Oct. 31, 2024

(51) Int. Cl.
*G05B 19/418* (2006.01)

(52) U.S. Cl.
CPC . *G05B 19/41875* (2013.01); *G05B 19/41865* (2013.01)

(58) Field of Classification Search
CPC ........ G05B 19/41875; G05B 19/41865; G05B 2219/32182; G05B 2219/32191; G05B 2219/32193; G05B 2219/32201; G05B 2219/32207; G05B 2219/32396
See application file for complete search history.

(56) References Cited

U.S. PATENT DOCUMENTS 7,010,364 B1 3/2006 Singh
10,354,462 B1 * 7/2019 Zhang .................... G07C 5/085
2009/0149981 A1 6/2009 Evans
(Continued)

FOREIGN PATENT DOCUMENTS

CN 101833307 B 5/2012
CN 107356552 A 11/2017
(Continued)

OTHER PUBLICATIONS

"Mujica etl al., Q-statistic and T2-statistic PCA-based measures for damage assessment in structures, Structural Health Monitoring, https://journals.sagepub.com/doi/epdf/10.1177/1475921710388972" (Year: 2010).*
(Continued)

*Primary Examiner* — Santosh R Poudel

(57) ABSTRACT

An illustrative method includes an anomaly detection system determining, for a batch generated in an industrial process, a $T^2$-statistic metric and a Q-statistic metric of the batch in a principal component analysis (PCA) model associated with the industrial process, determining an anomaly metric of the batch based on the $T^2$-statistic metric and the Q-statistic metric of the batch in the PCA model, determining that the batch is anomalous based on the anomaly metric of the batch, and performing an operation in response to determining that the batch is anomalous.

20 Claims, 10 Drawing Sheets

(56) References Cited

U.S. PATENT DOCUMENTS

| | | | | |
|---|---|---|---|---|
| 2010/0191361 | A1 | 7/2010 | Mccready | |
| 2010/0318934 | A1 | 12/2010 | Blevins | |
| 2011/0144947 | A1 * | 6/2011 | Myougan | F03G 4/074 702/183 |
| 2013/0069792 | A1 * | 3/2013 | Blevins | G06F 17/16 703/2 |
| 2013/0268238 | A1 | 10/2013 | Mccready | |
| 2015/0039530 | A1 * | 2/2015 | Jha | G06Q 40/06 705/36 R |
| 2016/0370258 | A1 * | 12/2016 | Perez | G05B 15/02 |
| 2017/0366414 | A1 * | 12/2017 | Hamilton | H04L 67/125 |
| 2018/0087790 | A1 * | 3/2018 | Perez | F24F 11/52 |
| 2019/0096648 | A1 * | 3/2019 | Deininger | H01J 49/164 |
| 2019/0332101 | A1 | 10/2019 | Castillo Castillo | |
| 2022/0390375 | A1 * | 12/2022 | Soto | G01J 3/44 |
| 2023/0243699 | A1 * | 8/2023 | Sun | B01F 35/2209 356/326 |

FOREIGN PATENT DOCUMENTS

| | | | | |
|---|---|---|---|---|
| CN | 112163688 | A | 1/2021 | |
| CN | 115291582 | A * | 11/2022 | G05B 23/024 |
| CN | 113134956 | B | 2/2023 | |
| CN | 116152010 | A | 5/2023 | |
| JP | 2013093027 | A | 5/2013 | |
| JP | 6733164 | B2 | 7/2020 | |
| WO | WO-2020054850 | A1 * | 3/2020 | G05B 23/02 |

OTHER PUBLICATIONS

Jon C. Gunther, Dale E. Seborg, and Jeremy S. Conner, "Fault Detection and Diagnosis in Industrial Fed-Batch Cell Culture", ADCHEM 2006, International Symposium on Advanced Control of Chemical Process, Apr. 2-5, 2006, 6 pages.

Carlos A. Duran-Villalobos, Stephen Goldrick, and Barry Lennox, "Multivariate statistical process control of an industrial-scale fed-batch simulator", Computers and Chemical Engineering, 132, Oct. 24, 2019, 13 pages.

Goldrick, S., Duran-Villalobos, C.A., Jankauskas, K., Lovett, D., Farid, S.S. and Lennox, B., "Modern day monitoring and control challenges outlined on an industrial-scale benchmark fermentation process", Computers & Chemical Engineering, 130, May 28, 2019, 14 pages.

Jesus Flores-Cerrillo and John F. MacGregor, "Control of batch product quality by trajectory manipulation using latent variable models", Journal of Process Control, Elsevier, Department of Chemical Engineering, McMaster University, Hamilton, Ontario, Canada, Sep. 22, 2003, 15 pages.

Jesus Flores-Cerrillo and John F. MacGregor, "Within-batch and batch-to-batch inferential-adaptive control of semibatch reactors: A partial least squares approach", Department of Chemical Engineering, McMaster University, Hamilton, Ontario, Canada, Ind. Eng. Chem. Res. 2003, 42, 3334-3345, 12 pages.

Parthasarathy Kesavan, Jay H. Lee, Victor Saucedo and Gopal A. Krishnagopalan, "PLS-based monitoring and control of batch digesters", Department of Chemical Engineering, Auburn University, 1998, 8 pages.

Kozub, D.J. and MacGregor, J.F., "Feedback control of polymer quality in semi-batch copolymerization reactors", Chemical Engineering Science, vol. 47, No. 4, pp. 929-942, 1992, 14 pages.

Gunther et al., "Fault Detection and Diagnosis in Industrial Fed-Batch Fermentation", 1-4244-0210-7/06, IEEE, Proceedings of the 2006 American Control Conference, Minneapolis, Minnesota, USA, Jun. 14-16, 2006, 6 pages.

Nomikos, Paul and Macgregor, John F., "Multivarate SPC Charts for Monitoring Batch Processes", American Statistical Association and American Society for Quality, Technometrics, vol. 37, No. 1, Feb. 1995, http://www.stor.org/stable/1269152, pp. 41-59, 20 pages.

Simca 15 User Guide, Sartorius, Sartorius Stedim Data Analytics, AB, Jun. 10, 2020, sartorius.com/umetrics, 519 pages.

Jon C. Gunther, Dale E. Seborg, Jeremy S. Conner, Fault Detection and Diagnosis in Industrial Fed-Batch Cell Culture, International Symposium on Advanced Control of Chemical Processes, Apr. 2-5, 2006, 7 pages.

Carlos A. Duran-Villalobos, Stephen Goldrick, Barry Lennox; Multivariate statistical process control of an industrial-scale fed-batch simulator, Computers and Chemical Engineering, Oct. 24, 2019, 13 pages.

Goldrick, S., Duran-Villalobos, C.A., Jankauskas, K., Lovett, D., Farid, S.S. and Lennox, B., Modern day monitoring and control challenges outlined on an industrial-scale benchmark fermentation process, Computers & Chemical Engineering, May 28, 2019, 14 pages.

M. Christ et al., "Time Series FeatuRe Extraction on basis of Scalable Hypothesis tests (tsfresh—A Python package)", Neurocomputing, https://doi.org/10.1016/j.neucom.2018.03.067, May 16, 2018, 7 pages.

V. Brunner et al., "Challenges in the Development of Soft Sensors for Bioproceses: A Critical Review", Frontiers in Bioengineering and Biotechnology, doi: 10.3389/fbioe.2021.722202, Aug. 20, 2021, 21 pages.

M. Christ et al., "tsfresh.feature_extraction package", Blue Yonder GmbH. Revision 0eb6ec02, https://tsfresh.readthedocs.io/en/latest/api/tsfresh.feature_extraction.html#tsfresh.feature_extraction.feature_calculators.abs_energy, 2023, 30 pages.

* cited by examiner

SYSTEMS AND METHODS FOR ANOMALY DETECTION IN INDUSTRIAL BATCH ANALYTICS

BACKGROUND

The present disclosure relates to batch analytics. In a more particular example, the disclosure relates to technologies for detecting anomaly in industrial batch analytics.

BRIEF DESCRIPTION

The following presents a simplified summary in order to provide a basic understanding of some aspects described herein. This summary is not an extensive overview nor is intended to identify key/critical elements or to delineate the scope of the various aspects described herein. The sole purpose of this summary is to present some concepts in a simplified form as a prelude to the more detailed description that is presented later.

In some embodiments, a method is provided. The method comprises determining, by an anomaly detection system and for a batch generated in an industrial process, a $T^2$-statistic metric and a Q-statistic metric of the batch in a principal component analysis (PCA) model associated with the industrial process; determining, by the anomaly detection system, an anomaly metric of the batch based on the $T^2$-statistic metric and the Q-statistic metric of the batch in the PCA model; determining, by the anomaly detection system, that the batch is anomalous based on the anomaly metric of the batch; and performing, by the anomaly detection system, an operation in response to determining that the batch is anomalous.

In some embodiments, a system is provided. The system comprises a memory storing instructions; and a processor communicatively coupled to the memory and configured to execute the instructions to: determine, for a batch generated in an industrial process, a $T^2$-statistic metric and a Q-statistic metric of the batch in a principal component analysis (PCA) model associated with the industrial process; determine an anomaly metric of the batch based on the $T^2$-statistic metric and the Q-statistic metric of the batch in the PCA model; determine that the batch is anomalous based on the anomaly metric of the batch; and perform an operation in response to determining that the batch is anomalous.

In some embodiments, a non-transitory computer-readable medium is provided. The non-transitory computer-readable medium stores instructions that, when executed, direct a processor of a computing device to: determine, for a batch generated in an industrial process, a $T^2$-statistic metric and a Q-statistic metric of the batch in a principal component analysis (PCA) model associated with the industrial process; determine an anomaly metric of the batch based on the $T^2$-statistic metric and the Q-statistic metric of the batch in the PCA model; determine that the batch is anomalous based on the anomaly metric of the batch; and perform an operation in response to determining that the batch is anomalous.

To the accomplishment of the foregoing and related ends, certain illustrative aspects are described herein in connection with the following description and the accompanying drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
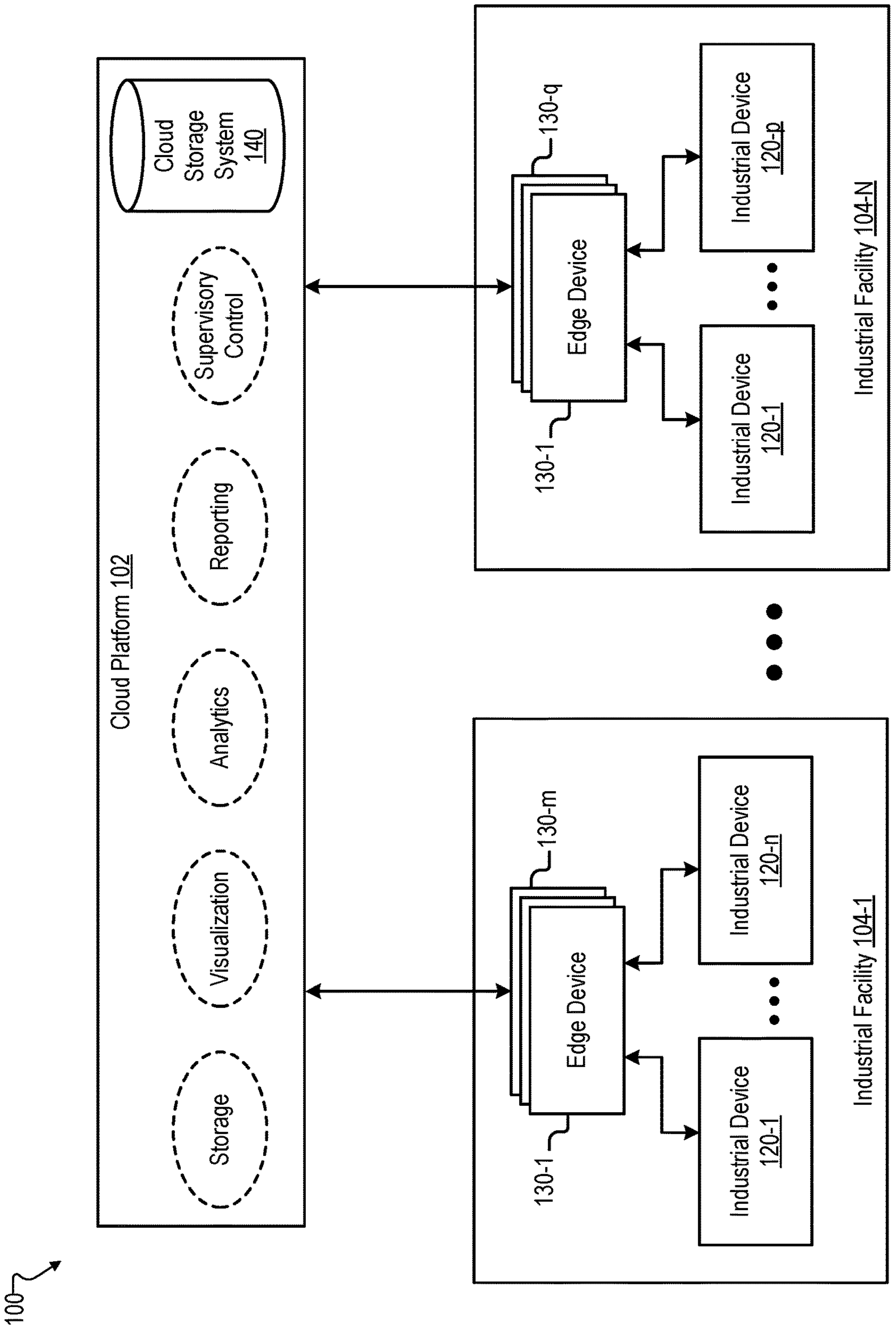
FIG. 1 illustrates an example system that manages industrial data.

The present disclosure is now described with reference to the drawings. In the following description, specific details may be set forth for purposes of explanation. It should be understood that the present disclosure may be implemented without these specific details.

As used herein, the terms "component," "system," "platform," "layer," "controller," "terminal," "station," "node," "interface" are intended to refer to a computer-related entity or an entity related to, or that is part of, an operational apparatus with one or more specific functionalities, wherein such entities may be hardware, a combination of hardware and software, software, or software in execution. For example, a component may be, but is not limited to being, a process running on a processor, a processor, a hard disk drive, multiple storage drives (of optical or magnetic storage medium) including affixed (e.g., screwed or bolted) or removable affixed solid-state storage drives, an object, an executable object, a thread of execution, a computer-executable program, and/or a computer. By way of illustration, both an application running on a server and the server may be a component. One or more components may reside within a process and/or thread of execution, and a component may be localized on one computer and/or distributed between two or more computers.

In addition, components as described herein may execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component may be an apparatus with specific functionality provided by mechanical parts operated by electric or electronic circuitry which is operated by a software or a firmware application executed by a processor, wherein the processor may be internal or external to the apparatus and may execute at least a part of the software or firmware application. As yet another example, a component may be an apparatus that provides specific functionality through electronic components without mechanical parts, the electronic components may include a processor therein to execute software or firmware that provides at least in part the functionality of the electronic components. As yet another example, interface(s) may include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" generally refer to the process of reasoning about or inferring states of the system, environment, and/or user from a set of observations as captured via events and/or data. For example, inference may be used to identify a specific context or action, or may generate a probability distribution over states. The inference may be probabilistic, e.g., the inference may be the computation of a probability distribution over states of interest based on a consideration of data and events. Inference may also refer to techniques employed for composing higher-level events from a set of events and/or data. Such inference may result in the construction of new events or actions from a set of observed events and/or stored event data, regardless of whether or not the events are correlated in close temporal proximity, and whether the events and data come from one or several event and data sources.

Moreover, the term "or" is intended to mean an inclusive "or" rather than an exclusive "or." In particular, unless clear from the context or specified otherwise, the phrase "X employs A or B" is intended to mean any of the natural inclusive permutations. Thus, the phrase "X employs A or B" is satisfied by any of the following instances: X employs A, X employs B, or X employs both A and B. In addition, the articles "a" and "an" as used in this present disclosure and the appended claims should generally be construed to mean "one or more" unless clear from the context or specified otherwise to be directed to a singular form.

Furthermore, the term "set" as used herein excludes the empty set, e.g., the set with no elements therein. Thus, a "set" in the present disclosure may include one or more elements or entities. For example, a set of controllers may include one or more controllers, a set of data resources may include one or more data resources, etc. Similarly, the term "group" as used herein refers to a collection of one or more entities. For example, a group of nodes refers to one or more nodes.

Various aspects or features will be presented in terms of systems that may include a number of devices, components, modules, and the like. It should be understood that various systems may include additional devices, components, modules, etc. and/or may not include all of the devices, components, modules, etc. that are discussed with reference to the figures. A combination of these approaches may also be used.

Systems and methods for anomaly detection in industrial batch analytics are described herein. In batch production, an industrial process such as a manufacturing process of a product may generate the product in multiple batches. For each batch generated in the industrial process, batch data may be collected and analyzed to determine whether the batch is anomalous. To determine whether the batch is anomalous, some systems may rely on one or more established metrics that are commonly used in anomaly detection. The systems may compute the established metrics for the batch based on the batch data, and determine whether the batch is anomalous based on the established metrics of the batch. However, determining whether the batch is anomalous based on the established metrics often results in a high number of detection results that are false positive or false negative. A detection result that is false positive where an anomaly is incorrectly detected may cause the industrial process to be stopped unnecessarily, thereby causing production loss. On the other hand, a detection result that is false negative where an anomaly goes unnoticed may result in products generated in the batch being unqualified and therefore unusable. Thus, the anomaly detection using the established metrics of the batch is generally unreliable due to its inconsistent accuracy.

Systems and methods described herein are capable of accurately performing anomaly detection for a batch using an anomaly metric that is determined based on a plurality of statistical metrics of the batch. For example, for a batch generated an industrial process, the systems and methods may determine a $T^2$-statistic metric and a Q-statistic metric of the batch in a Principal Component Analysis (PCA) model associated with the industrial process. The systems and methods may then determine the anomaly metric of the batch based on both the $T^2$-statistic metric and the Q-statistic metric of the batch in the PCA model. For example, the systems and methods may compute a normalized $T^2$-statistic metric based on the $T^2$-statistic metric of the batch, compute a normalized Q-statistic metric based on the Q-statistic metric of the batch, and determine the anomaly metric of the batch to be a highest value between the normalized $T^2$-statistic metric and the normalized Q-statistic metric.

The systems and methods described herein may determine whether the batch is anomalous based on the anomaly metric of the batch. For example, the systems and methods may determine that the anomaly metric of the batch satisfies an anomaly detection threshold, and therefore determine that the batch is anomalous. In response to determining that the batch is anomalous, the systems and methods may perform a corresponding operation. For example, the systems and methods may present to a process operator of the industrial process a notification indicating that the batch is anomalous. Additionally or alternatively, the systems and methods may identify, from various process variables of the industrial process, one or more process variables that contribute significantly to the batch being anomalous, and present the one or more process variables and their contribution towards the batch performance to the process operator. Additionally or alternatively, the systems and methods may automatically adjust these process variables of the industrial process to address the anomaly of the batch. Other operations may also be performed in response to determining that the batch is anomalous.

Systems and methods described herein may be advantageous in a number of technical respects. For example, as described herein, the systems and methods may compute the normalized $T^2$-statistic metric of the batch based on the $T^2$-statistic metric of the batch and a confidence limit of the $T^2$-statistic metric. The systems and methods may also compute the normalized Q-statistic metric of the batch based on the Q-statistic metric of the batch and a confidence limit of the Q-statistic metric. The normalization of the $T^2$-statistic metric and the Q-statistic metric may result in the normalized $T^2$-statistic metric and the normalized Q-statistic metric of the batch being in the same scale and therefore can be compared to one another. As described herein, the systems and methods may determine the anomaly metric of the batch to be the highest value between the normalized $T^2$-statistic metric and the normalized Q-statistic metric. Thus, for each batch of the industrial process, the systems and methods may dynamically select a normalized statistical metric that better indicates a conformity level of the batch with the PCA model to be the anomaly metric of the batch. As described herein, the PCA model may be created based on one or more non-anomalous batches generated in the industrial process. Thus, by using the anomaly metric of the batch that better indicates the conformity level of the batch with the PCA model, the accuracy in detecting anomaly for the batch may be improved.

In addition, the systems and methods may determine whether the anomaly metric of the batch satisfies an anomaly detection threshold. If the anomaly metric of the batch satisfies the anomaly detection threshold (e.g., the anomaly metric exceeds the anomaly detection threshold), the systems and methods may determine that the batch is anomalous. As described herein, the systems and methods may determine the anomaly detection threshold using a machine learning model. For example, the systems and methods may apply the machine learning model to one or more batches of the industrial process to identify, among a plurality of candidate anomaly detection thresholds, a candidate anomaly detection threshold that results in a lowest false detection rate when being used to detect anomaly for the one or more batches. The systems and methods may then select the candidate anomaly detection threshold to be the anomaly detection threshold. Thus, by using the anomaly detection threshold that results in the lowest false detection rate in anomaly detection, the accuracy in detecting anomaly for a batch using the anomaly detection threshold may be improved.

Moreover, the systems and methods may detect anomaly not only for a batch that is already finished but also for a batch that is ongoing. As described herein, for a batch that is ongoing and not yet complete, the systems and methods may determine an anomaly metric corresponding to a sample point during the batch using a PCA model of the industrial process corresponding to the sample point. The anomaly metric of the batch that corresponds to the sample point may also be referred to as the anomaly metric of the batch at the sample point. As described herein, the systems and methods may determine whether the anomaly metric of the batch at the sample point satisfies the anomaly detection threshold. If the anomaly metric of the batch at the sample point satisfies the anomaly detection threshold (e.g., the anomaly metric exceeds the anomaly detection threshold), the systems and methods may determine that the batch is anomalous at the sample point. In other words, the systems and methods may determine that a portion of the batch that is generated from a start point of the batch up to the sample point during the batch is anomalous.

As described herein, the systems and methods may generate a visual presentation of the anomaly metric for the batch based on the anomaly metric of the batch at different sample points as the batch proceeds in real-time. The systems and methods may present the visual presentation of the anomaly metric for the batch to the process operator of the industrial process. This implementation is advantageous, because it facilitates the process operator in monitoring the anomaly metric of the batch while the batch is ongoing.

As described herein, the systems and methods may also determine one or more process variables of the industrial process that contribute significantly to the anomaly metric of the batch at a particular sample point, and present to the process operator the one or more process variables and their contribution to the anomaly metric of the batch at the particular sample point. Thus, when the systems and methods determine that the batch is anomalous at the particular sample point, the process operator may reference the one or more process variables and their contribution to the anomaly metric of the batch at the particular sample point and adjust the industrial process accordingly. For example, the process operator may adjust a process variable among the one or more process variables of the industrial process to address the anomaly of the batch. As described herein, for each process variable among the one or more process variables, the systems and methods may provide an average value of the process variable in one or more non-anomalous batches of the industrial process to the process operator, thereby facilitating the process operator in adjusting the process variable to address the anomaly of the batch. Additionally or alternatively, when determining that the batch is anomalous at the particular sample point, the systems and methods may provide a recommendation to terminate the particular batch in advance, for example, due to a long time window between a start point of the batch and the particular sample point. In this case, the process operator may consider the recommendation and decide to dispose of the batch. Accordingly, the process operator may terminate the batch before the batch is complete to avoid further wasting production resources on the batch that is not being used.

As described herein, the systems and methods may evaluate the one or more process variables and their contribution to the anomaly metric of the batch at the particular sample point and/or evaluate the time window between the start point of the batch and the particular sample point, and automatically address the anomaly of the batch or terminate the batch based on such evaluation. This implementation is advantageous, because it enables an automatic response to the batch being detected as anomalous without human intervention.

Various illustrative embodiments will now be described in detail with reference to the figures. It should be understood that the illustrative embodiments described below are provided as examples and that other examples not explicitly described herein may also be captured by the scope of the claims set forth below. The systems and methods described herein may provide any of the benefits mentioned above, as well as various additional and/or alternative benefits that will be described and/or made apparent below.

FIG. 1 illustrates an example system 100 for managing industrial data generated by one or more industrial automation systems. As depicted in FIG. 1, the system 100 may include a cloud platform 102 and one or more industrial facilities 104 of an industrial enterprise. The industrial facilities 104 may include one or more industrial devices 120 and one or more edge devices 130 as depicted in FIG. 1.

In some embodiments, the industrial devices 120 may perform various operations and/or functionalities within an industrial environment. Non-limiting examples of an industrial device 120 may include, but are not limited to, an industrial controller (e.g., programmable automation controller such as programmable logic controller (PLC), etc.), a field device (e.g., a sensor, a meter, an Internet of Things (IoT) device, etc.), a motion control device (e.g., a motor drive, etc.), an operator interface device (e.g., a human-machine interface device, an industrial monitor, a graphic terminal, a message display device, etc.), an industrial automated machine (e.g., an industrial robot, etc.), a lot control system (e.g., a barcode marker, a barcode reader, etc.), a vision system device (e.g., a vision camera, etc.), a safety relay, an optical safety system, and/or other types of industrial devices. In some embodiments, an industrial device 120 may be positioned at a fixed location within the industrial facility 104. Alternatively, the industrial device 120 may be part of a mobile control system such as a control system implemented in a truck or in a service vehicle.

In some embodiments, the industrial devices 120 in one or more industrial facilities 104 may form one or more industrial automation systems. Non-limiting examples of the industrial automation system may include, but are not limited to, a batch control system (e.g., a mixing system, etc.), a continuous control system (e.g., a proportional integral derivative (PID) control systems, etc.), a discrete control system, and/or other types of industrial automation systems. In some embodiments, the industrial automation system may perform one or more industrial processes that are related to product manufacturing, material handling, and/or other industrial operations within the industrial facilities 104.

In some embodiments, the industrial controllers in the industrial automation system may facilitate the monitoring and/or control of an industrial process performed by the industrial automation system. For example, the industrial controllers may communicate with the field devices using native hardwired I/O or via a plant network (e.g., Ethernet/IP, Data Highway Plus, ControlNet, DeviceNet, etc.) and receive digital and/or analog signals from the field devices. The received signals may indicate a current state of the field devices and/or a current state (e.g., a temperature, a position, a part presence or absence, a fluid level, etc.) of the industrial process performed by the industrial automation system. In some embodiments, the industrial controllers may execute a control program that performs automated decision-making for the industrial process based on the received signals. The industrial controllers may then output corresponding digital and/or analog control signals to the field devices in accordance with the decisions made by the control program. For example, the output signals may include a device actuation signal, a temperature control signal, a position control signal, an operational command to a machining or material handling robot, a mixer control signal, a motion control signal, and/or other types of output signals. In some embodiments, the control program may include any suitable type of code to process input signals provided to the industrial controller and to control output signals generated by the industrial controller. For example, the control program may include ladder logic, sequential function charts, function block diagrams, structured text, and/or other programming structures.

In some embodiments, the edge devices 130 may collect industrial data from the industrial devices 120 and/or from other data sources (e.g., a local data store, an on-premises processing system, etc.) and transmit the data to the cloud platform 102 for storage and/or processing. For example, the edge devices 130 may collect the data from the industrial devices 120 and/or from other data sources at a predefined interval (e.g., every 3 s) and transmit the collected data to the cloud platform 102. In some embodiments, an edge device 130 may be located within an industrial facility 104 as an on-premises device that facilitates data communication between the industrial devices 120 in the industrial facility 104 and the cloud platform 102.

In some embodiments, the cloud platform 102 may provide various cloud-based services for the industrial automation systems implemented in the industrial facilities 104 of the industrial enterprise. As depicted in FIG. 1, non-limiting examples of the cloud-based services may include, but are not limited to, data storage, visualization, data analytics, reporting, supervisory control, and/or other types of cloud-based services. In some embodiments, the cloud platform 102 may be a public cloud in which the cloud-based services are provided by a cloud service provider and accessible through a public network (e.g., the Internet) upon subscription to the cloud-based services. Alternatively, the cloud platform 102 may be a semi-private cloud in a shared cloud environment or in a corporate cloud environment. Alternatively, the cloud platform 102 may be a private cloud that is operated internally by the industrial enterprise. For example, the private cloud may include one or more computing devices (e.g., physical or virtual servers) that host the cloud-based services and reside within a corporate network protected by a firewall.

In some embodiments, the cloud platform 102 may implement one or more applications and/or storage systems to provide the cloud-based services. For example, the cloud platform 102 may implement a cloud storage system 140 to which data may be ingested for data storage and data analytics. As another example, the cloud platform 102 may implement a control application that performs remote decision-making for an industrial automation system. The control application may generate one or more control commands based on real-time data that is collected from the industrial automation system and transmitted to the cloud platform 102, and issue the control commands to the industrial automation system. As another example, the cloud platform 102 may implement a lot control application that tracks a product unit throughout various stages of production and collects production data (e.g., a barcode identifier, an abnormal flag, production statistics, quality test data, etc.) as the product unit passes through each stage. The cloud platform 102 may also implement a visualization application (e.g., a cloud-based Human Machine Interface (HMI)), a reporting application, an Enterprise Resource Planning (ERP) application, and/or other applications to provide corresponding cloud-based services to one or more industrial automation systems implemented by the industrial enterprise.

In some embodiments, the cloud-based services provided by the cloud platform 102 may facilitate various operations of the industrial automation systems implemented by the industrial enterprise. For example, the cloud-based storage provided by the cloud platform 102 may be dynamically scaled to accommodate a massive amount of data continuously generated by the industrial devices 120 of the industrial automation systems. As another example, the industrial facilities 104 that are located at different geographical locations may transmit data generated by their industrial automation systems to the cloud platform 102 for aggregation, collective analysis, visualization, and/or enterprise-level reporting without the need to establish one or more private networks between the industrial facilities 104. As another example, a diagnostic application implemented on the cloud platform 102 may monitor a working condition of various industrial automation systems and/or various industrial devices 120 included in the industrial automation systems across a particular industrial facility 104, or across multiple industrial facilities 104 of the industrial enterprise. In some embodiments, the cloud platform 102 may also provide software as a service, thereby alleviating the burden of software maintenance, software upgrade, and/or software backup for various software applications implemented in the industrial automation systems.

In some embodiments, an industrial automation system may perform an industrial process in an industrial facility 104 of the industrial enterprise. The industrial process may be a process that generates one or more batches of product. For example, the industrial process may be a manufacturing process of penicillin in a bioreactor. In some embodiments, the industrial process may be associated with one or more process variables. The process variables may indicate a manufacturing condition in which the batches are generated in the industrial process. For example, in the industrial process that manufactures penicillin, the process variables may include a substrate flow rate, a cooling water flow rate, a temperature, a pH level, an off-gas $CO_2$ level, an off-gas $O_2$ level, an aeration rate, an agitator rate, etc. Other examples of the industrial process and the process variables of the industrial process are also possible and contemplated.

In some embodiments, for each batch generated in the industrial process, the system 100 may collect batch data of the batch. The batch data may include one or more samples collected at a predefined interval (e.g., every 3 s) during the batch. Each sample may be collected at a sample point during the batch and may include values of various process variables of the industrial process at the sample point. In some embodiments, to collect a sample of the batch at a sample point, one or more edge devices 130 may obtain values of various process variables of the industrial process at the sample point from one or more industrial devices 120 (e.g., a sensor, a field device, an IoT device, etc.) included in the industrial process that generates the batch. The edge devices 130 may then aggregate the values of the process variables in a predefined order to form the sample of the batch, and transmit the sample of the batch to the cloud platform 102. Thus, the batch data may include one or more samples collected at one or more sample points during the batch. In some embodiments, the batch data may be analyzed by an anomaly detection system to determine whether the batch is anomalous. In some embodiments, the batch data may be collected and analyzed as the batch proceeds in real-time. Additionally or alternatively, the batch data may be collected as the batch proceeds in real-time and may be analyzed after the batch is complete (e.g., during an off-peak time window).

Figure 2:
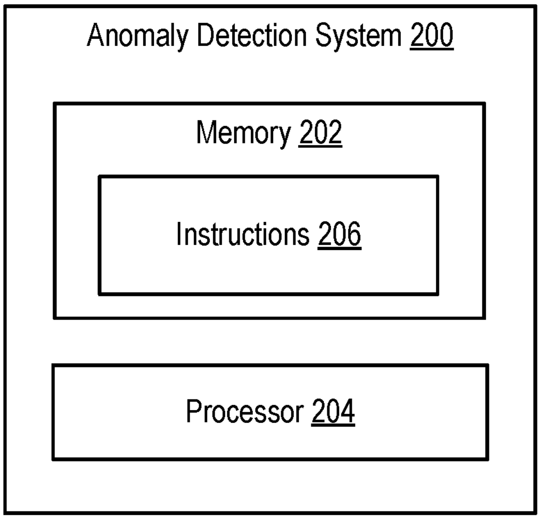
FIG. 2 illustrates an example anomaly detection system.

FIG. 2 illustrates an example anomaly detection system 200 for analyzing batch data of a batch generated in an industrial process and determining whether the batch is anomalous. In some embodiments, the anomaly detection system 200 may be implemented by computing resources such as servers, processors, memory devices, storage devices, communication interfaces, and/or other computing resources. In some embodiments, the anomaly detection system 200 may be implemented at the edge device 130, the cloud platform 102, and/or other components of the system 100. In some embodiments, various components of the system 100 may collaborate with one another to perform one or more functionalities of the anomaly detection system 200 described herein.

As depicted in FIG. 2, the anomaly detection system 200 may include, without limitation, a memory 202 and a processor 204 communicatively coupled to one another. The memory 202 and the processor 204 may each include or be implemented by computer hardware that is configured to store and/or execute computer software. Other components of computer hardware and/or software not explicitly shown in FIG. 2 may also be included within the anomaly detection system 200. In some embodiments, the memory 202 and the processor 204 may be distributed between multiple devices and/or multiple locations as may serve a particular implementation.

The memory 202 may store and/or otherwise maintain executable data used by the processor 204 to perform one or more functionalities of the anomaly detection system 200 described herein. For example, the memory 202 may store instructions 206 that may be executed by the processor 204. In some embodiments, the memory 202 may be implemented by one or more memory or storage devices, including any memory or storage devices described herein, that are configured to store data in a transitory or non-transitory manner. In some embodiments, the instructions 206 may be executed by the processor 204 to cause the anomaly detection system 200 to perform one or more functionalities described herein. The instructions 206 may be implemented by any suitable application, software, code, and/or other executable data instance. Additionally, the memory 202 may also maintain any other data accessed, managed, used, and/or transmitted by the processor 204 in a particular implementation.

The processor 204 may be implemented by one or more computer processing devices, including general purpose processors (e.g., central processing units (CPUs), graphics processing units (GPUs), microprocessors, etc.), special purpose processors (e.g., application specific integrated circuits (ASICs), field-programmable gate arrays (FPGAs), etc.), or the like. The anomaly detection system 200 may use the processor 204 (e.g., when the processor 204 is directed to perform operations represented by instructions 206 stored in the memory 202) and perform various functionalities associated with anomaly detection for a batch in any manner described herein or as may serve a particular implementation.

Figure 3:
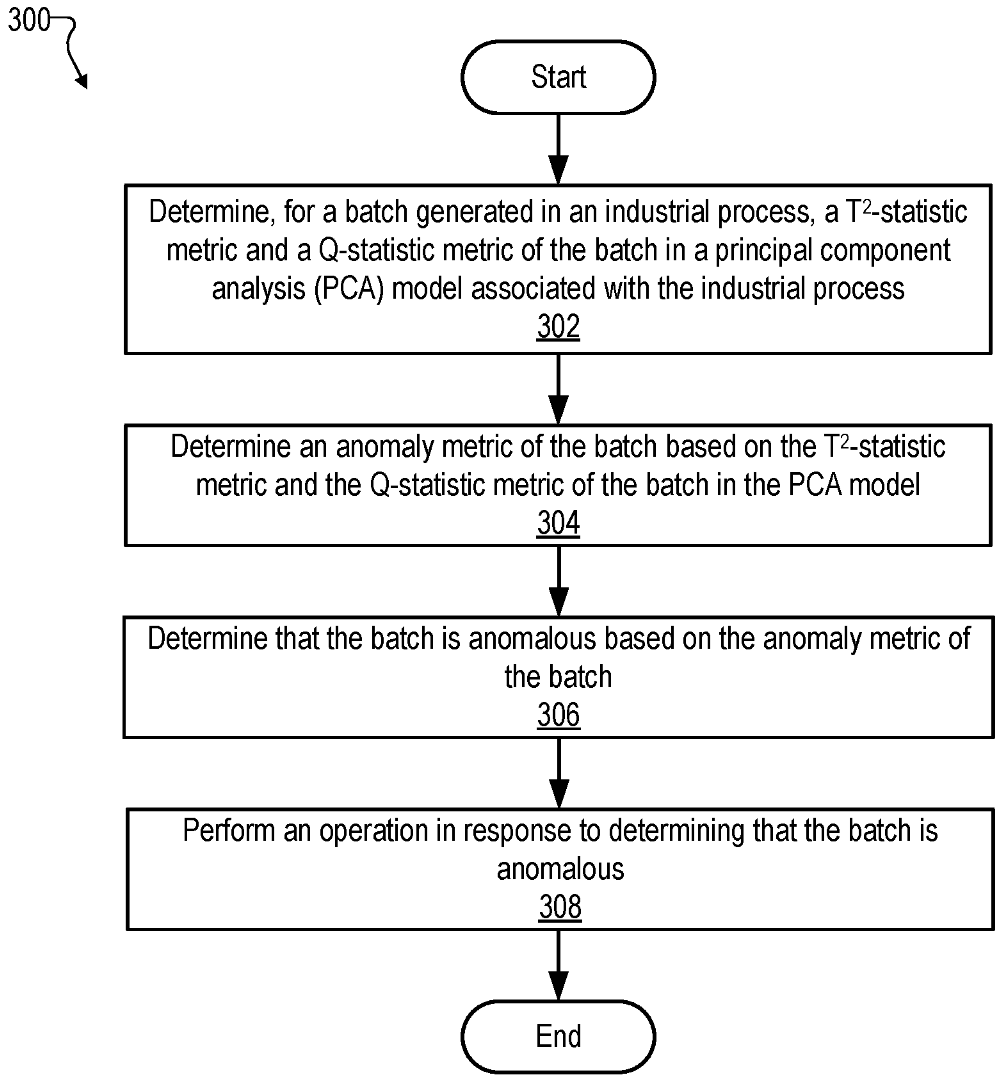
FIG. 3 illustrates an example anomaly detection method.

FIG. 3 illustrates an example anomaly detection method 300 (e.g., the method 300) for performing anomaly detection for a batch generated in an industrial process. While FIG. 3 shows illustrative operations according to one embodiment, other embodiments may omit, add to, reorder, and/or modify any of the operations shown in FIG. 3. In some examples, multiple operations shown in FIG. 3 or described in relation to FIG. 3 may be performed concurrently (e.g., in parallel) with one another, rather than being performed sequentially as illustrated and/or described. One or more of the operations shown in FIG. 3 may be performed by an anomaly detection system such as the anomaly detection system 200 and/or any implementation thereof.

At operation 302, the anomaly detection system 200 may determine, for a batch generated in an industrial process, a $T^2$-statistic metric and a Q-statistic metric of the batch in a Principal Component Analysis (PCA) model associated with the industrial process. The PCA model may be created based on one or more non-anomalous batches generated in the industrial process in which each non-anomalous batch is verified to not include any anomaly throughout its batch duration. In some embodiments, if the batch is already complete, the anomaly detection system 200 may use a PCA model associated with the industrial process that corresponds to an entire batch. In some embodiments, if the batch is ongoing and not yet complete, the anomaly detection system 200 may use a PCA model associated with the industrial process that corresponds to a particular sample point in the batch duration.

At operation 304, the anomaly detection system 200 may determine an anomaly metric of the batch based on the $T^2$-statistic metric and the Q-statistic metric of the batch in the PCA model. For example, the anomaly detection system 200 may compute a normalized $T^2$-statistic metric of the batch based on the $T^2$-statistic metric of the batch and a confidence limit of the $T^2$-statistic metric. The anomaly detection system 200 may compute a normalized Q-statistic metric of the batch based on the Q-statistic metric of the batch and a confidence limit of the Q-statistic metric. The anomaly detection system 200 may then compare the normalized $T^2$-statistic metric and the normalized Q-statistic metric of the batch, and determine the anomaly metric of the batch based on such comparison. For example, the anomaly detection system 200 may determine the anomaly metric of the batch to be a highest value between the normalized $T^2$-statistic metric and the normalized Q-statistic metric of the batch.

At operation 306, the anomaly detection system 200 may determine that the batch is anomalous based on the anomaly metric of the batch. For example, the anomaly detection system 200 may determine that the anomaly metric of the batch satisfies an anomaly detection threshold (e.g., the anomaly metric exceeds the anomaly detection threshold), and therefore determine that the batch is anomalous. In some embodiments, the anomaly detection threshold may be a predefined threshold value (e.g., 1). Additionally or alternatively, the anomaly detection threshold may be determined using a machine learning model.

At operation 308, the anomaly detection system 200 may perform an operation in response to determining that the batch is anomalous. For example, the anomaly detection system 200 may present to a process operator of the industrial process a notification indicating that the batch is anomalous. As another example, the batch may be ongoing and the anomaly detection system 200 may identify, from various process variables of the industrial process, one or more process variables that contribute significantly to the batch being anomalous. The anomaly detection system 200 may then present the one or more process variables and their contribution towards the batch performance to the process operator to facilitate the process operator in addressing the anomaly of the batch. Additionally or alternatively, the anomaly detection system 200 may automatically adjust the one or more process variables based on their average value in one or more non-anomalous batches of the industrial process to address the anomaly of the batch. The anomaly detection system 200 may also perform other operations in response to determining that the batch is anomalous.

Thus, the anomaly detection system 200 may perform the anomaly detection for the batch generated in the industrial process. As described herein, the industrial process may generate one or more batches. In some embodiments, each batch may extend for a predefined batch duration from a start point of the batch to an end point of the batch. If the batch reached its end point, the industrial process may already generate the entire batch and the batch may be considered complete or finished. On the other hand, if the industrial process is still generating the batch and the batch has not reached its end point, the batch may be considered ongoing or in progress.

As described herein, the system 100 may collect multiple samples at a predefined interval (e.g., every 3 s) during the batch. Each sample may be collected at a sample point during the batch and may include values of various process variables of the industrial process at the sample point. In some embodiments, each sample point may be considered a reference point in the batch duration and may indicate a point in time at which a particular sample of a batch is collected relative to a start point of that batch. For example, the system 100 may collect K samples (e.g., 1150 samples) at the predefined interval (e.g., every 3 s) during each batch. Thus, the batch data of each batch may include K samples (e.g., 1150 samples) respectively collected at K sample points (e.g., 1150 sample points) within the batch duration of that batch. Accordingly, at a sample point k during a first batch, a sample $k^{th}$ of the first batch may be collected. Similarly, at the sample point k during a second batch, a sample $k^{th}$ of the second batch may be collected. A time distance between the sample point k during the first batch and the start point of the first batch may be equal to a time distance between the sample point k during the second batch and the start point of the second batch.

As described herein, the anomaly detection system 200 may perform anomaly detection for the batch using a PCA model associated with the industrial process. In some embodiments, the industrial process may have multiple PCA models, each PCA model may correspond to a sample point within the batch duration. Thus, for the industrial process in which K samples (e.g., 1150 samples) are respectively collected at K sample points for each batch, the anomaly detection system 200 may generate K PCA models (e.g., 1150 PCA models) corresponding to K sample points. Among K PCA models, a PCA model corresponding to sample point K may be considered the PCA model corresponding to entire batch, because the sample point K is the last sample point in the batch duration by which all K samples of a batch are collected. In some embodiments, to evaluate the anomaly for a batch that is complete, the anomaly detection system 200 may use the PCA model corresponding to entire batch among K PCA models (e.g., 1150 PCA models) of the industrial process. On the other hand, to evaluate the anomaly for an ongoing batch at a sample point k during the batch, the anomaly detection system 200 may use a PCA model corresponding to sample point k among K PCA models (e.g., 1150 PCA models) of the industrial process. In some embodiments, the anomaly detection system 200 may generate K PCA models (e.g., 1150 PCA models) for the industrial process in advance, and store these PCA models in a data storage (e.g., a local data storage and/or the cloud storage system 140).

As described herein, the anomaly detection system 200 may generate the PCA models for the industrial process based on one or more non-anomalous batches of the industrial process in which each non-anomalous batch is verified to not include any anomaly throughout its batch duration. In some embodiments, to create a PCA model, the anomaly detection system 200 may generate an input matrix corresponding to the PCA model from one or more samples in each non-anomalous batch, and create the PCA model based on the input matrix.

Figure 4:
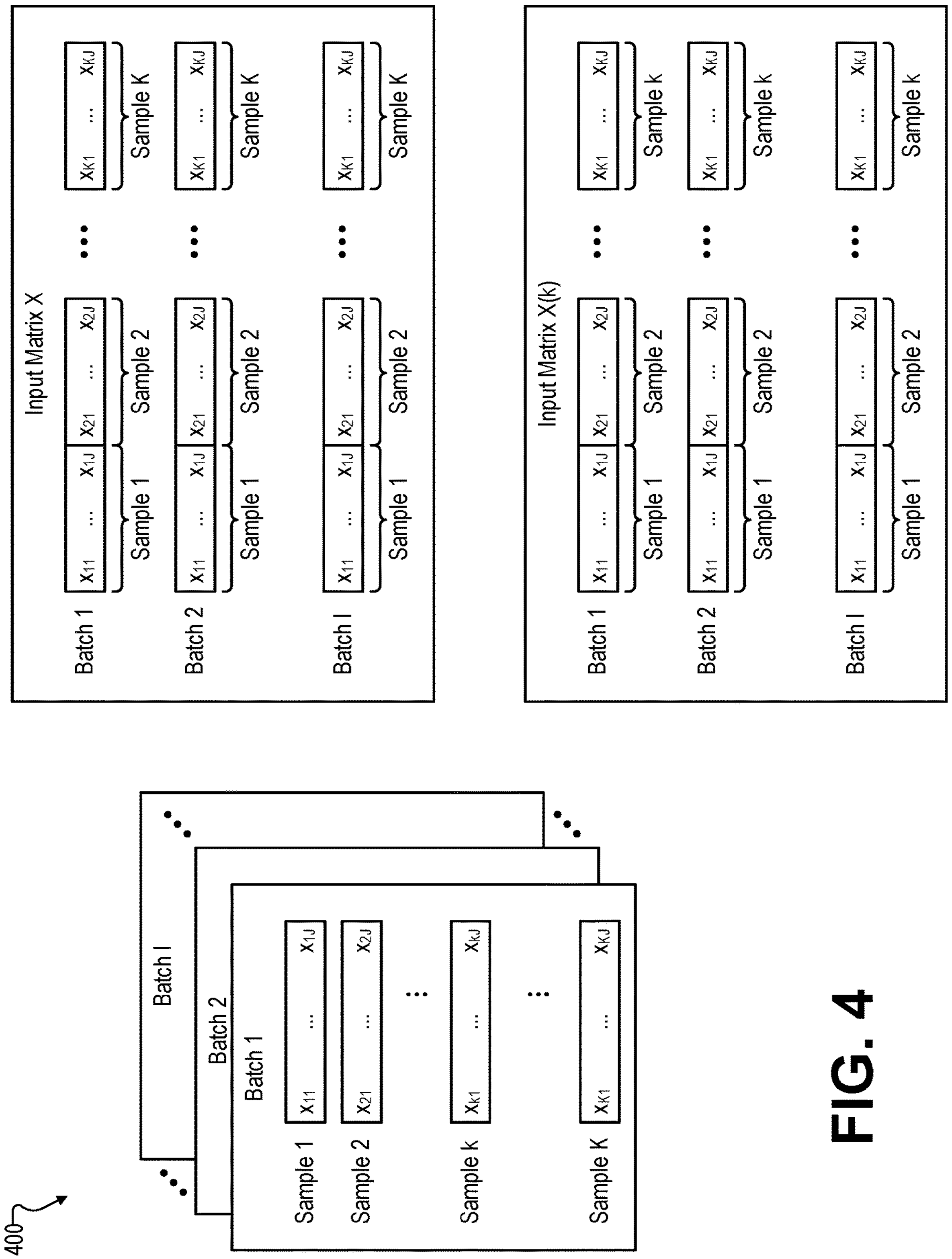
FIG. 4 illustrates an example of non-anomalous batches, an input matrix associated with the non-anomalous batches, and an input matrix associated with the non-anomalous batches that corresponds to a sample point.

To illustrate, FIG. 4 shows a diagram 400 illustrating non-anomalous batches, an input matrix X corresponding to an entire batch, and an input matrix X(k) corresponding to a sample point k in the batch duration. As depicted in FIG. 4, the anomaly detection system 200 may use I non-anomalous batches (e.g., batch 1 to batch I) to generate the PCA models for the industrial process. Each non-anomalous batch may include K samples (e.g., sample 1 to sample K) that are respectively collected at K sample points (e.g., sample point 1 to sample point K, not shown) during the non-anomalous batch. Each sample in the non-anomalous batch may be collected at a sample point during the non-anomalous batch and may include J values of J process variables of the industrial process that are obtained at the sample point.

In some embodiments, the anomaly detection system 200 may generate the input matrix X corresponding to an entire batch and use the input matrix X to create the PCA model corresponding to entire batch for the industrial process. To generate the input matrix X, for each non-anomalous batch in I non-anomalous batches, the anomaly detection system 200 may aggregate K samples of the non-anomalous batch in a chronological order of their sample points to form one row of the input matrix X as depicted in FIG. 4. Accordingly, each row in the input matrix X may represent an entire non-anomalous batch and may include all K samples collected during the non-anomalous batch. As described herein, each sample of the non-anomalous batch may include J values of J process variables of the industrial process. Thus, the input matrix X may have the following dimensions:

$$X \in M_{I \times (J*K)}$$

In some embodiments, the input matrix X may be subjected to an autoscaling operation (e.g., standardization transformation). The autoscaling operation may be performed for each column of the input matrix X and may move a center of a data cloud representing the elements in the column of the input matrix X to their mean value and normalize the elements in the column of the input matrix X. As a result of the autoscaling operation, for each column of the input matrix X, the elements in the column may center around their mean value and may have a unit variance (e.g., the standard deviation of 1). Accordingly, the dominance impact of the elements in the column of the input matrix X that are in large value ranges and the impact of non-linear trend in the input data when creating the PCA model may be mitigated.

As describe above, the input matrix X may be used to create the PCA model corresponding to entire batch. As described herein, the PCA model corresponding to entire batch may be the PCA model corresponding to sample point K among K PCA models of the industrial process. In some embodiments, the PCA model corresponding to entire batch may include one or more principal components, each principal component may be a linear combination of (J*K) initial variables corresponding to (J*K) columns of the input matrix X. These principal components may be uncorrelated to one another and may represent directions of the data in the input matrix X that indicate a maximal amount of variance. Accordingly, these principal components may be perpendicular to one another and may capture most variance (most information) of the data in the input matrix X. Thus, these principal components may form a principal component space in which the differences (the variance) between the data points representing the data in the input matrix X are better indicated as compared to an original space formed by (J*K) initial variables corresponding to (J*K) columns of the input matrix X. In the original space formed by (J*K) initial variables and in the principal component space formed by the principal components of the PCA model corresponding to entire batch, each data point may correspond to a particular row of the input matrix X and may represent a non-anomalous batch at its end point with all K samples of the non-anomalous batch being included in the particular row of the input matrix X.

Figure 5:
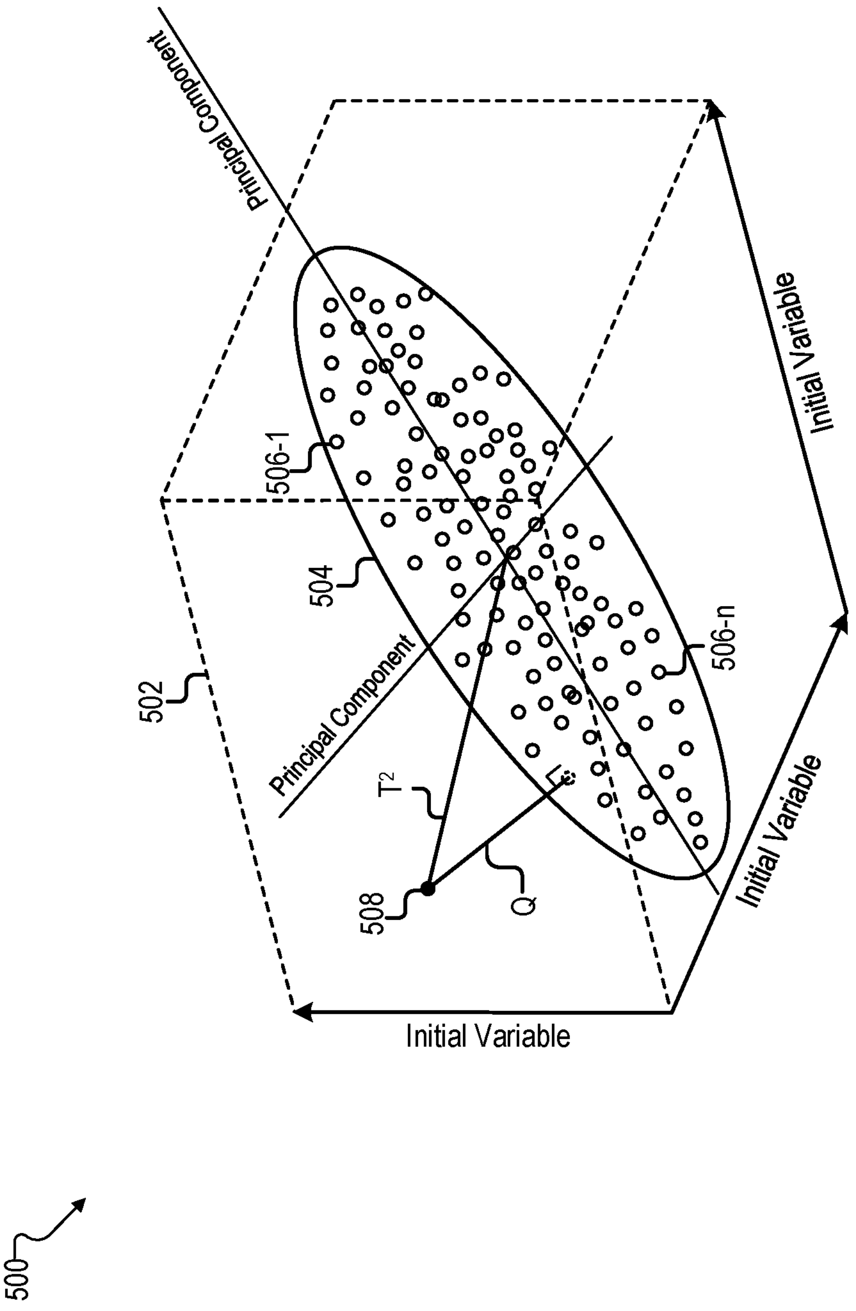
FIG. 5 illustrates an example principal component space of a principal component analysis (PCA) model.

An example of an original space and a principal component space of a PCA model is illustrated in diagram 500 of FIG. 5. As depicted in FIG. 5, an original space 502 may be formed by the initial variables corresponding to the columns of an input matrix and a principal component space 504 may be formed by the principal components of a PCA model generated from the input matrix. Data in the input matrix may be represented by a plurality of data points 506 as depicted in FIG. 5. In case of the PCA model corresponding to entire batch that is generated from the input matrix X, each data point 506 may correspond to a particular row of the input matrix X and may represent a non-anomalous batch at its end point with all samples collected during the non-anomalous batch being included in the input matrix X as described above. In this case, the principal component space 504 may represent the principal component space of the PCA model corresponding to entire batch and the original space 502 may represent the original space formed by (J*K) initial variables corresponding to (J*K) columns of the input matrix X. As depicted in FIG. 5, the principal component space 504 may provide a different perspective from which the differences (the variance) between the data points 506 are better indicated as compared to the original space 502. It should be understood that the original space 502 and the principal component space 504 depicted in FIG. 5 are merely an example. The original space 502 may be formed by a different number of initial variables than the number of initial variables depicted in FIG. 5, and the principal component space 504 may be formed by a different number of principal components than the number of principal components depicted in FIG. 5.

As described above, the anomaly detection system 200 may generate the PCA model corresponding to entire batch based on the input matrix X. To generate the PCA model corresponding to entire batch, the anomaly detection system 200 may compute a covariance matrix C from the input matrix X as follows:

$$C = \frac{1}{I-1} X^T X \in M_{(J*K) \times (J*K)} \quad \text{(Equation 1)}$$

In Equation 1, I is the number of non-anomalous batches that are used to generate the PCA model corresponding to entire batch and other PCA models of the industrial process. The anomaly detection system 200 may then compute eigenvectors of the covariance matrix C and an eigenvalue of each eigenvector. The covariance matrix C may have (J*K) eigenvectors and (J*K) eigenvalues corresponding to (J*K) eigenvectors. The eigenvectors may represent the directions where there is the most variance of the data in the input matrix X, and therefore the eigenvectors may be used as the principal components of the PCA model corresponding to entire batch. Each eigenvector may have an eigenvalue and the eigenvalue may indicate the amount of variance carried in that eigenvector. Accordingly, the eigenvalue of each eigenvector may be referred to as the eigenvalue of the principal component that corresponds to the eigenvector and may indicate the amount of variance carried in that principal component. As the covariance matrix C has (J*K) eigenvectors, the PCA model corresponding to entire batch may have a maximum of (J*K) principal components.

In some embodiments, for each principal component among (J*K) principal components, the anomaly detection system 200 may compute a percentage between the eigenvalue of the principal component and a sum of the eigenvalues of (J*K) principal components. The percentage of the eigenvalue of the principal component may indicate a percentage of the variance of the data in the input matrix X that is carried by the principal component and may be referred to as the percentage of variance carried by the principal component. In some embodiments, the anomaly detection system 200 may select one or more principal components that carry the highest percentages of variance among (J*K) principal components. For example, the anomaly detection system 200 may select a total of A principal components that carry the highest percentages of variance among (J*K) principal components and have the total percentage of variance collectively carried by A principal components satisfying a predefined percentage threshold (e.g., ≥95%). The principal components being selected may be referred to as the retained principal components of the PCA model corresponding to entire batch. Other principal components may be omitted and may not be used in creating the PCA model corresponding to entire batch.

In some embodiments, the anomaly detection system 200 may form a loading matrix P of the PCA model corresponding to entire batch based on the retained principal components of the PCA model corresponding to entire batch. Each retained principal component may form a column of the loading matrix P. Thus, the loading matrix P may represent the principal component space of the PCA model corresponding to entire batch and may have the following dimensions:

$$P \in M_{(J*K)\times A}$$

In some embodiments, the anomaly detection system 200 may compute a score matrix T based on the input matrix X and the loading matrix P of the PCA model corresponding to entire batch. The score matrix T may indicate the projection of the input data, which is represented by the input matrix X, onto the principal component space of the PCA model corresponding to entire batch, which is represented by the loading matrix P. In some embodiments, the anomaly detection system 200 may compute the score matrix T as follows:

$$T = XP \in M_{I\times A} \quad \text{(Equation 2)}$$

Thus, the loading matrix $P \in M_{(J*K)\times A}$ and the score matrix $T \in M_{I\times A}$ may represent the PCA model corresponding to entire batch and may be generated from the input matrix $X \in M_{I\times(J*K)}$ that represents all K samples in the entire batch for each non-anomalous batch being used to generate the PCA models for the industrial process. In some embodiments, the loading matrix P and the score matrix T of the PCA model corresponding to entire batch may be generated in advance and may be stored in a data storage (e.g., a local data storage and/or the cloud storage system 140). In some embodiments, the anomaly detection system 200 may recompute the loading matrix P and the score matrix T of the PCA model corresponding to entire batch periodically (e.g., every 2 months) using the non-anomalous batches that are generated most recently in the industrial process.

In some embodiments, in addition to the PCA model corresponding to entire batch, the anomaly detection system 200 may also create a PCA model for each sample point in the batch duration. For example, for a sample point k in the batch duration, the anomaly detection system 200 may create a PCA model corresponding to sample point k. The PCA model corresponding to sample point k may be created in a manner similar to the manner in which the PCA model corresponding to entire batch is created as described above. However, instead of using the input matrix X corresponding to an entire batch when generating the PCA model corresponding to entire batch, the anomaly detection system 200 may use an input matrix X(k) corresponding to the sample point k when creating the PCA model corresponding to sample point k.

To generate the input matrix X(k), for each non-anomalous batch in I non-anomalous batches, the anomaly detection system 200 may identify k samples that are collected between a start point of the non-anomalous batch and the sample point k during the non-anomalous batch. The anomaly detection system 200 may then aggregate k samples in a chronological order of their sample points to form one row of the input matrix X(k) as depicted in FIG. 4. Accordingly, each row in the input matrix X(k) may represent a portion of a non-anomalous batch that includes k samples collected from the beginning of the non-anomalous batch up to the sample point k during the non-anomalous batch. As described herein, each sample of the non-anomalous batch may include J values of J process variables of the industrial process. Thus, the input matrix X(k) may have the following dimensions:

$$X(k) \in M_{I\times(J*k)}$$

In some embodiments, similar to the input matrix X, the input matrix X(k) may be subjected to the autoscaling operation (e.g., standardization transformation). The autoscaling operation may be performed for each column of the input matrix X(k) and may move a center of a data cloud representing the elements in the column of the input matrix X(k) to their mean value and normalize the elements in the column of the input matrix X(k). As a result of the autoscaling operation, for each column of the input matrix X(k), the elements in the column may center around their mean value and may have a unit variance (e.g., the standard deviation of 1). Accordingly, the dominance impact of the elements in the column of the input matrix X(k) that are in large value ranges and the impact of non-linear trend in the input data when creating the PCA model may be mitigated.

As describe above, the input matrix X(k) may be used to create the PCA model corresponding to sample point k. In some embodiments, the PCA model corresponding to sample point k may include one or more principal components, each principal component may be a linear combination of (J*k) initial variables corresponding to (J*k) columns of the input matrix X(k). These principal components may be uncorrelated to one another and may represent directions of the data in the input matrix X(k) that indicate a maximal amount of variance. Accordingly, these principal components may be perpendicular to one another and may capture most variance (most information) of the data in the input matrix X(k). Thus, these principal components may form a principal component space in which the differences (the variance) between the data points representing the data in the input matrix X(k) are better indicated as compared to an original space formed by (J*k) initial variables corresponding to (J*k) columns of the input matrix X(k). In the original space formed by (J*k) initial variables and in the principal component space formed by the principal components of the PCA model corresponding to sample point k, each data point may correspond to a particular row of the input matrix X(k) and may represent a non-anomalous batch at the sample point k with k samples that are collected from the start point of the non-anomalous batch up to the sample point k during the non-anomalous batch being included in the particular row of the input matrix X(k).

Considering the illustration in FIG. 5 in case of the PCA model corresponding to sample point k that is generated from the input matrix X(k), each data point 506 may correspond to a particular row of the input matrix X(k) and may represent a non-anomalous batch at the sample point k with k samples collected from the start point up to the sample point k of the non-anomalous batch being included in the input matrix X(k) as described above. In this case, the principal component space 504 may represent the principal component space of the PCA model corresponding to sample point k and the original space 502 may represent the original space formed by (J*k) initial variables corresponding to (J*k) columns of the input matrix X(k). As described herein with reference to FIG. 5, the principal component space 504 may provide a different perspective from which the differences (the variance) between the data points 506 are better indicated as compared to the original space 502.

As described above, the anomaly detection system 200 may generate the PCA model corresponding to sample point k from the input matrix X(k). Similar to generating the PCA model corresponding to entire batch, to generate the PCA model corresponding to sample point k, the anomaly detection system 200 may compute a covariance matrix C(k) from the input matrix X(k) as follows:

$$C(k) = \frac{1}{I-1} X(k)^T X(k) \in M_{(J*k)\times(J*k)} \qquad \text{(Equation 3)}$$

In Equation 3, I is the number of non-anomalous batches that are used to generate the PCA model corresponding to entire batch and other PCA models of the industrial process. The anomaly detection system 200 may then compute eigenvectors of the covariance matrix C(k) and an eigenvalue of each eigenvector. The covariance matrix C(k) may have (J*k) eigenvectors and (J*k) eigenvalues corresponding to (J*k) eigenvectors. The eigenvectors may represent the directions where there is the most variance of the data in the input matrix X(k), and therefore may be used as the principal components of the PCA model corresponding to sample point k. Each eigenvector may have an eigenvalue and the eigenvalue may indicate the amount of variance carried in that eigenvector. Accordingly, the eigenvalue of each eigenvector may be referred to as the eigenvalue of the principal component that corresponds to the eigenvector and may indicate the amount of variance carried in that principal component. As the covariance matrix C(k) has (J*k) eigenvectors, the PCA model corresponding to sample point k may have a maximum of (J*k) principal components.

In some embodiments, for each principal component among (J*k) principal components, the anomaly detection system 200 may compute a percentage between the eigenvalue of the principal component and a sum of the eigenvalues of (J*k) principal components. The percentage of the eigenvalue of the principal component may indicate a percentage of the variance of the data in the input matrix X(k) that is carried by the principal component and may be referred to as the percentage of variance carried by the principal component. In some embodiments, the anomaly detection system 200 may select one or more principal components that carry the highest percentages of variance among (J*k) principal components. For example, the anomaly detection system 200 may select a total of A principal components that carry the highest percentages of variance among (J*k) principal components and have the total percentage of variance collectively carried by A principal components satisfying a predefined percentage threshold (e.g., ≥95%). The principal components being selected may be referred to as the retained principal components of the PCA model corresponding to sample point k. Other principal components may be omitted and may not be used in creating the PCA model corresponding to sample point k.

It should be understood that the total number of retained principal components (e.g., A) in the PCA model corresponding to sample point k may be the same as or may be different from the total number of retained principal components in other PCA models of the industrial process (such as the PCA model corresponding to entire batch and/or the PCA model corresponding to another sample point).

In some embodiments, the anomaly detection system 200 may form a loading matrix P(k) of the PCA model corresponding to sample point k based on the retained principal components of the PCA model corresponding to sample point k. Each retained principal component may form a column of the loading matrix P(k). Thus, the loading matrix P(k) may represent the principal component space of the PCA model corresponding to sample point k and may have the following dimensions:

$$P(k) \in M_{(J*k)\times A}$$

In some embodiments, the anomaly detection system 200 may compute a score matrix T(k) based on the input matrix X(k) and the loading matrix P(k) of the PCA model corresponding to sample point k. The score matrix T(k) may indicate the projection of the input data, which is represented by the input matrix X(k), onto the principal component space of the PCA model corresponding to sample point k, which is represented by the loading matrix P(k). In some embodiments, the anomaly detection system 200 may compute the score matrix T(k) as follows:

$$T(k) = X(k)P(k) \in M_{I\times A} \qquad \text{(Equation 4)}$$

Thus, the loading matrix $P(k) \in M_{(J*k)\times A}$ and the score matrix $T(k) \in M_{I\times A}$ may represent the PCA model corresponding to sample point k and may be generated from the input matrix $X(k) \in M_{I\times(J*k)}$. As described herein, the input matrix X(k) may represent k samples that are collected from the start point up to the sample point k in the batch duration for each non-anomalous batch being used to generate the PCA models for the industrial process. Similar to the PCA model corresponding to entire batch, the loading matrix P(k) and the score matrix T(k) of the PCA model corresponding to sample point k may be generated in advance and may be stored in a data storage (e.g., a local data storage and/or the cloud storage system 140). In some embodiments, the anomaly detection system 200 may re-compute the loading matrix P(k) and the score matrix T(k) of the PCA model corresponding to sample point k periodically (e.g., every 2 months) using the non-anomalous batches that are generated most recently in the industrial process.

Thus, as described above, each PCA model (e.g., the PCA model corresponding to entire batch, the PCA model corresponding to sample point k) may be generated from the non-anomalous batches of the industrial process and may represent a principal component space in which each non-anomalous batch is represented as a data point and the variance between the data points (the differences between the non-anomalous batches) are better indicated in the principal component space of the PCA model as compared to the original space formed by the initial variables corresponding to the sample data of the non-anomalous batches. As described herein, for the PCA model corresponding to entire batch, each data point may represent an entire non-anomalous batch, and therefore may reflect all K samples collected during the non-anomalous batch. For the PCA model corresponding to sample point k, each data point may represent a portion of a non-anomalous batch up to the sample point k, and therefore may reflect k samples collected from the start point up to the sample point k during the non-anomalous batch.

In some embodiments, the anomaly detection system 200 may use the PCA models to determine whether a batch generated in the industrial process is anomalous. As described herein, to determine whether a complete batch is anomalous, the anomaly detection system 200 may use the PCA model corresponding to entire batch. To determine whether an ongoing batch is anomalous at a sample point k during the ongoing batch, the anomaly detection system 200 may use the PCA model corresponding to sample point k.

To illustrate, to perform the anomaly detection for a particular batch that is complete or finished, the anomaly detection system 200 may determine a $T^2$-statistic metric and a Q-statistic metric of the particular batch in the PCA model corresponding to entire batch using the loading matrix P and the score matrix T of the PCA model corresponding to entire batch.

For example, the anomaly detection system 200 may generate an input vector x representing the particular batch. Because the particular batch is complete, the particular batch may include all K samples of the particular batch, each sample may be collected at a sample point during the particular batch and may include J values of J process variables of the industrial process that are obtained at the sample point. To generate the input vector x for the particular batch, the anomaly detection system 200 may unfold K samples of the particular batch into the input vector x. For example, the anomaly detection system 200 may aggregate K samples of the particular batch in a chronological order of their sample points to form the only row of the input vector x. Thus, the input vector x representing the particular batch may have the following dimensions:

$$x \in M_{1\times(J*K)}$$

In some embodiments, the anomaly detection system 200 may compute a score t for the particular batch based on the input vector x and the loading matrix P of the PCA model corresponding to entire batch. The score t of the particular batch may indicate a projection of the data point corresponding to the particular batch, which is represented by the input vector x, onto the principal component space of the PCA model corresponding to entire batch, which is represented by the loading matrix P. In some embodiments, the anomaly detection system 200 may compute the score t of the particular batch as follows:

$$t = xP(P^TP)^{-1} \in M_{1\times A} \quad \text{(Equation 5)}$$

In some embodiments, the anomaly detection system 200 may compute the $T^2$-statistic metric of the particular batch based on the score t of the particular batch and the score matrix T of the PCA model corresponding to entire batch. The $T^2$-statistic metric of the particular batch may indicate the variance of the data point corresponding to the particular batch within the PCA model corresponding to entire batch. In some embodiments, the anomaly detection system 200 may compute the $T^2$-statistic metric of the particular batch as follows:

$$T^2 = t\left(\frac{T^TT}{(I-1)}\right)^{-1} t^T \in R_{1\times 1} \quad \text{(Equation 6)}$$

In Equation 6, I is the number of non-anomalous batches that are used to generate the PCA model corresponding to entire batch and other PCA models of the industrial process as described herein.

In some embodiments, the anomaly detection system 200 may compute a residual error e for the particular batch based on the input vector x, the score t, and the loading matrix P of the PCA model corresponding to entire batch. The residual error e of the particular batch may indicate the difference of the data point corresponding to the particular batch and the projection of that data point back to the original space of the initial variables after that data point is projected onto the principal component space of the PCA model corresponding to entire batch. In some embodiments, the anomaly detection system 200 may compute the residual error e of the particular batch as follows:

$$e = x - tP^T \in M_{1\times(J*K)} \quad \text{(Equation 7)}$$

In some embodiments, the anomaly detection system 200 may compute the Q-statistic metric of the particular batch based on the residual error e of the particular batch. The Q-statistic metric of the particular batch may indicate the difference (the residual) of the data point corresponding to the particular batch and the projection of that data point onto the PCA model corresponding to entire batch. In some embodiments, the anomaly detection system 200 may compute the Q-statistic metric of the particular batch as follows:

$$Q = ee^T \in R_{1\times 1} \quad \text{(Equation 8)}$$

Thus, the $T^2$-statistic metric and the Q-statistic metric of the particular batch may indicate a conformity level of the particular batch with the PCA model corresponding to entire batch that is created based on the non-anomalous batches generated in the industrial process. As described above, the $T^2$-statistic metric of the particular batch may indicate the variance of the data point corresponding to the particular batch within the PCA model corresponding to entire batch. In other words, the $T^2$-statistic metric may indicate the distance between the data point corresponding to the particular batch and the origin of the model plane in the PCA model corresponding to entire batch. Thus, the $T^2$-statistic metric may indicate the deviation of the particular batch from its desired state within the PCA model corresponding to entire batch. On the other hand, the Q-statistic metric of the particular batch may indicate the difference of the data point corresponding to the particular batch and the projection of that data point onto the PCA model corresponding to entire batch. In other words, the Q-statistic metric may indicate the residual or the squared distance between the data point representing the particular batch and the model plane of the PCA model corresponding to entire batch. Thus, the $T^2$-statistic metric and the Q-statistic metric may indicate 2 types of variance of the data point corresponding to the particular batch in the PCA model corresponding to entire batch. In FIG. 5, the particular batch may be represented by a data point 508 and the distances represented by the $T^2$-statistic metric and the Q-statistic metric of the particular batch are also depicted in FIG. 5.

In some embodiments, to evaluate the anomaly of the particular batch, the anomaly detection system 200 may not use the $T^2$-statistic metric and the Q-statistic metric of the particular batch, but instead using a normalized $T^2$-statistic metric and a normalized Q-statistic metric of the particular batch.

In some embodiments, the anomaly detection system 200 may compute the normalized $T^2$-statistic metric of the particular batch based on the $T^2$-statistic metric of the particular batch and a confidence limit $$T_\alpha^2$$

of the $T^2$-statistic metric. The confidence limit $$T_\alpha^2$$

of the $T^2$-statistic metric may be an upper limit of a confidence interval of the $T^2$-statistic metric that is associated with a predefined α level (e.g., α=5%). In some embodiments, the predefined α level may correspond to a confidence level, and the confidence level may be equal to (1−α)*100%. For example, an a level of 5% may correspond to a confidence level of 95%. In some embodiments, the confidence interval of the $T^2$-statistic metric that is associated with the predefined α level or with the confidence level corresponding to the predefined α level may be a value range where the $T^2$-statistic metrics of the non-anomalous batches lie within with the confidence level. For example, a confidence interval of the $T^2$-statistic metric that is associated with the confidence level of 95% may be the value range where the $T^2$-statistic metrics of the non-anomalous batches lie within 95% of the time, and the confidence limit $$T_\alpha^2$$

of the $T^2$-statistic metric may be the upper limit of that confidence interval.

In some embodiments, the anomaly detection system 200 may compute the confidence limit $$T_\alpha^2$$

of the $T^2$-statistic metric based on the PCA model corresponding to entire batch. In some embodiments, the anomaly detection system 200 may compute the confidence limit $$T_\alpha^2$$

of the $T^2$-statistic metric as follows:

$$T_\alpha^2 = \frac{A(I-1)}{I-A} F_{A,I-A,\alpha} \qquad \text{(Equation 9)}$$

In Equation 9. I is the number of non-anomalous batches that are used to generate the PCA model corresponding to entire batch and other PCA models of the industrial process. A is the number of retained principal components of the PCA model corresponding to entire batch. $F_{A,I-A,\alpha}$ is the F-distribution under an assumption of the predefined α level, with the PCA model being generated from I batches and including A retained principal components.

In some embodiments, the anomaly detection system 200 may compute the normalized $T^2$-statistic metric $$(T_{norm}^2)$$

of the particular batch based on the $T^2$-statistic metric of the particular batch and the confidence limit $$T_\alpha^2$$

of the $T^2$-statistic metric as follows:

$$T_{norm}^2 = \frac{T^2}{T_\alpha^2} \qquad \text{(Equation 10)}$$

Similarly, the anomaly detection system 200 may compute the normalized Q-statistic metric of the particular batch based on the Q-statistic metric of the particular batch and a confidence limit $Q_\alpha$ of the Q-statistic metric. The confidence limit $Q_\alpha$ of the Q-statistic metric may be an upper limit of a confidence interval of the Q-statistic metric that is associated with a predefined α level. In some embodiments, the confidence interval of the Q-statistic metric that is associated with the predefined α level or with the confidence level corresponding to the predefined α level may be a value range where the Q-statistic metrics of the non-anomalous batches lie within with the confidence level. For example, a confidence interval of the Q-statistic metric that is associated with the confidence level of 95% may be the value range where the Q-statistic metrics of the non-anomalous batches lie within 95% of the time, and the confidence limit $Q_\alpha$ of the Q-statistic metric may be the upper limit of that confidence interval.

In some embodiments, the anomaly detection system 200 may compute the confidence limit $Q_\alpha$ of the Q-statistic metric based on the PCA model corresponding to entire batch. In some embodiments, the anomaly detection system 200 may compute the confidence limit $Q_\alpha$ of the Q-statistic metric as follows:

$$Q_\alpha = \theta_1\left(\frac{z_\alpha(2\theta_2 h_0^2)^{0.5}}{\theta_1} + 1 + \frac{\theta_2 h_0(h_0 - 1)}{\theta_1^2}\right)^{\frac{1}{h_0}} \quad \text{(Equation 11)}$$

In Equation 11, $z_\alpha$ is the standardized normal variable corresponding to the predefined α level. To compute other components in Equation 11, the anomaly detection system 200 may compute a residual matrix E of the PCA model corresponding to entire batch as follows:

$$E = X - TP^T \in M_{I\times(J*K)} \quad \text{(Equation 12)}$$

The anomaly detection system 200 may then compute a covariance matrix V of the residual matrix E as follows:

$$V = \frac{EE^T}{I-1} \in M_{I\times I} \quad \text{(Equation 13)}$$

In Equation 13, I is the number of non-anomalous batches that are used to generate the PCA model corresponding to entire batch and other PCA models of the industrial process as described herein.

The anomaly detection system 200 may then compute $\theta_1$, $\theta_2$, and $\theta_3$ based on the covariance matrix V as follows:

$$\theta_i = \text{trace}(V^i) \text{ for } i = 1, 2, 3 \quad \text{(Equation 14)}$$

Thus, $\theta_1$ is the sum of the diagonal elements in the covariance matrix V, $\theta_2$ is the sum of the diagonal elements in the covariance matrix V squared, and $\theta_3$ is the sum of the diagonal elements in the covariance matrix V cubed.

The anomaly detection system 200 may then compute $h_0$ as follows:

$$h_0 = 1 - \frac{2\theta_1\theta_3}{3\theta_2} \quad \text{(Equation 15)}$$

In some embodiments, after computing the components based on Equations 12-15 as described above, the anomaly detection system 200 may use these components in Equation 11 to compute the confidence limit $Q_\alpha$ of the Q-statistic metric. The anomaly detection system 200 may then compute the normalized Q-statistic metric ($Q_{norm}$) of the particular batch based on the Q-statistic metric of the particular batch and the confidence limit $Q_\alpha$ of the Q-statistic metric as follows:

$$Q_{norm} = \frac{Q}{Q_\alpha} \quad \text{(Equation 16)}$$

Thus, according to Equation 10, to compute the normalized $T^2$-statistic metric of the particular batch, the anomaly detection system 200 may divide the $T^2$-statistic metric of the particular batch by the upper limit $$T_\alpha^2$$

of the confidence interval of the $T^2$-statistic metric where the $T^2$-statistic metrics of the non-anomalous batches lie within most of the time (e.g., 95% of the time, if the confidence level is 95%). Similarly, according to Equation 16, to compute the normalized Q-statistic metric of the particular batch, the anomaly detection system 200 may divide the Q-statistic metric of the particular batch by the upper limit $Q_\alpha$ of the confidence interval of the Q-statistic metric where the Q-statistic metrics of the non-anomalous batches lie within most of the time (e.g., 95% of the time, if the confidence level is 95%). Thus, due to this normalization, the normalized $T^2$-statistic metric of the particular batch and the normalized Q-statistic metric of the particular batch may be brought to the same scale.

To illustrate, assuming that the particular batch is not anomalous. In this case, the $T^2$-statistic metric of the particular batch may likely (e.g., 95% likely, if the confidence level is 95%) lie within the confidence interval of the $T^2$-statistic metric for the non-anomalous batches, and therefore the normalized $T^2$-statistic metric of the particular batch may likely (e.g., 95% likely) fall within [0, 1] according to Equation 10. Similarly, when the particular batch is not anomalous, the Q-statistic metric of the particular batch may likely (e.g., 95% likely, if the confidence level is 95%) lie within the confidence interval of the Q-statistic metric for the non-anomalous batches, and therefore the normalized Q-statistic metric of the particular batch may likely (e.g., 95% likely) fall within [0, 1] according to Equation 16. Thus, in this case, the normalized $T^2$-statistic metric of the particular batch and the normalized Q-statistic metric of the particular batch may both likely be in the value range [0, 1] even though the $T^2$-statistic metric of the particular batch and the Q-statistic metric of the particular batch may be in very different value ranges prior to normalization. Because the normalization brings the normalized $T^2$-statistic metric of the particular batch and the normalized Q-statistic metric of the particular batch to the same scale, the normalized $T^2$-statistic metric of the particular batch and the normalized Q-statistic metric of the particular batch can be compared to one another.

In some embodiments, the anomaly detection system 200 may compare the normalized $T^2$-statistic metric of the particular batch and the normalized Q-statistic metric of the particular batch, and determine an anomaly metric of the particular batch based on such comparison. For example, the anomaly detection system 200 may determine the anomaly metric of the particular batch to be the highest value between the normalized $T^2$-statistic metric of the particular batch and the normalized Q-statistic metric of the particular batch. Accordingly, the anomaly detection system 200 may determine the anomaly metric of the particular batch as follows:

$$\text{Anomaly metric} = \max(T_{norm}^2, Q_{norm}) \quad \text{(Equation 17)}$$

Determining the anomaly metric of the particular batch using Equation 17 is advantageous. As described herein, the $T^2$-statistic metric and the Q-statistic metric of the particular batch may indicate 2 types of variance of the data point corresponding to the particular batch in the PCA model corresponding to entire batch (also referred to in this paragraph as the PCA model for simplification). Thus, according to Equation 17, the anomaly detection system 200 may select, between the normalized $T^2$-statistic metric and the normalized Q-statistic metric of the particular batch, the normalized metric that indicates the larger amount of variation to be the anomaly metric of the particular batch. In other words, the normalized metric that better indicates the variance between the data point corresponding to the particular batch and the data points corresponding to the non-anomalous batches in the PCA model, and therefore better indicates the inconformity of the particular batch with the PCA model, may be selected as the anomaly metric of the particular batch. As a result, the accuracy in detecting anomaly for the particular batch based on the anomaly metric of the particular batch may be improved.

Due to the flexibility in selecting which normalized metric to be the anomaly metric for a batch, the anomaly metric of the particular batch may be the normalized $T^2$-statistic metric of the particular batch, while the anomaly metric of a different batch may be the normalized Q-statistic metric of the different batch. Alternatively, the anomaly metric of the particular batch may be the normalized Q-statistic metric of the particular batch, while the anomaly metric of the different batch may be the normalized $T^2$-statistic metric of the different batch.

In some embodiments, the anomaly detection system 200 may determine whether the anomaly metric of the particular batch satisfies an anomaly detection threshold. If the anomaly metric of the particular batch satisfies the anomaly detection threshold (e.g., the anomaly metric exceeds the anomaly detection threshold), the anomaly detection system 200 may determine that the particular batch is anomalous.

In some embodiments, the anomaly detection threshold may be a predefined threshold value. For example, the anomaly detection threshold may be equal to 1. In this case, if the anomaly metric of the particular batch is the normalized $T^2$-statistic metric of the particular batch and the anomaly metric of the particular batch exceeds the anomaly detection threshold (e.g., $$\left(\text{e.g., } T^2_{norm} = \frac{T^2}{T^2_\alpha} > 1\right),$$

), the anomaly detection system 200 may determine that the $T^2$-statistic metric of the particular batch is higher than the upper limit $$T^2_\alpha$$

of the confidence interval of the $T^2$-statistic metric. Thus, the anomaly detection system 200 may determine that the $T^2$-statistic metric of the particular batch falls outside the confidence interval where the $T^2$-statistic metrics of the non-anomalous batches lie within most of the time (e.g., 95% of the time, if the confidence level is 95%). Accordingly, the anomaly detection system 200 may determine that the particular batch is anomalous.

Similarly, if the anomaly metric of the particular batch is the normalized Q-statistic metric of the particular batch and the anomaly metric of the particular batch exceeds the anomaly detection threshold (e.g., $$\left(\text{e.g., } Q_{norm} = \frac{Q}{Q_\alpha} > 1\right),$$

), the anomaly detection system 200 may determine that the Q-statistic metric of the particular batch is higher than the upper limit $Q_\alpha$ of the confidence interval of the Q-statistic metric. Thus, the anomaly detection system 200 may determine that the Q-statistic metric of the particular batch falls outside the confidence interval where the Q-statistic metrics of the non-anomalous batches lie within most of the time (e.g., 95% of the time, if the confidence level is 95%). Accordingly, the anomaly detection system 200 may determine that the particular batch is anomalous.

However, using a predefined threshold value (e.g., 1) as the anomaly detection threshold may result in false positives and/or false negatives in anomaly detection. As an example, because the confidence interval corresponds to a confidence level that is below 100%, there is a possibility that the $T^2$-statistic metric (or the Q-statistic metric) of the particular batch may fall outside the confidence interval where the $T^2$-statistic metrics (or the Q-statistic metrics) of the non-anomalous batches lie within most of the time (e.g., 95% of the time, if the confidence level is 95%) but the particular batch is actually non-anomalous. In this case, the anomaly detection result for the particular batch may be a false positive.

Figure 6:
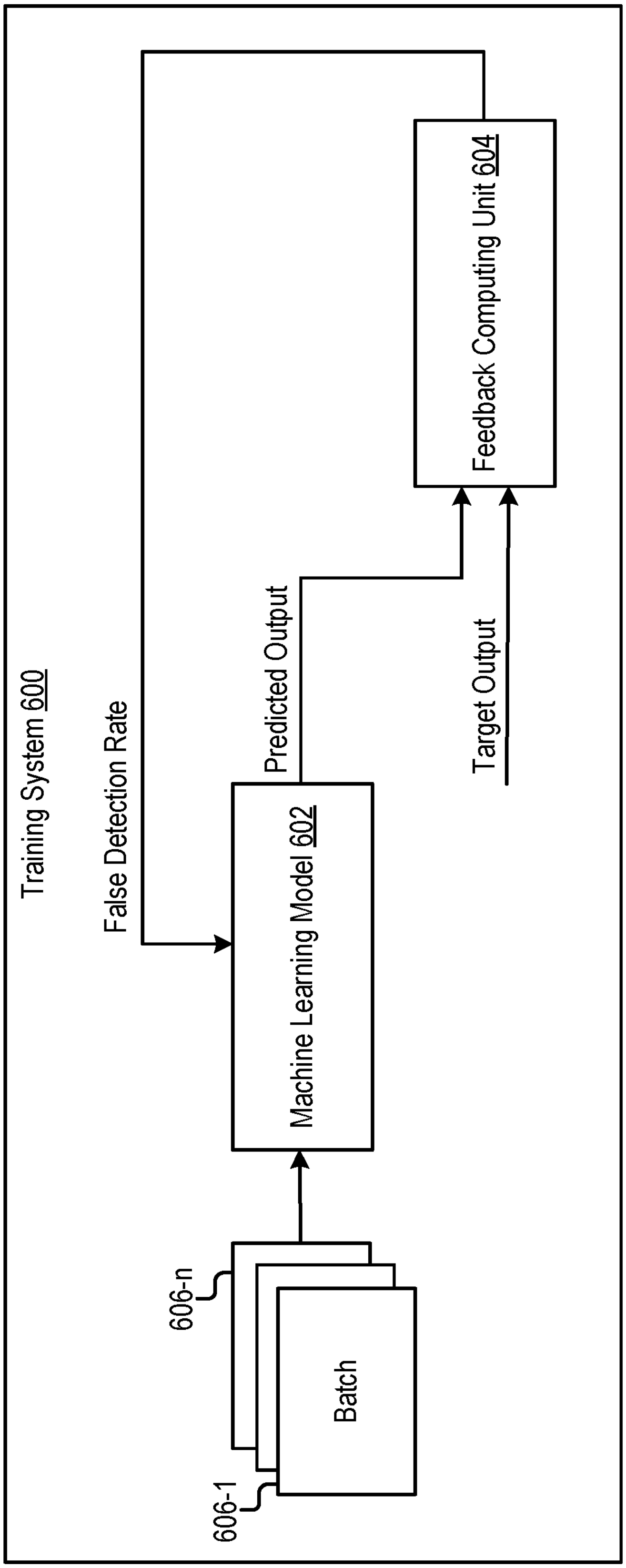
FIG. 6 illustrates an example training system for training a machine learning model.

In some embodiments, to reduce the false positives and the false negatives in anomaly detection, instead of or in addition to using a predefined threshold value as the anomaly detection threshold as described above, the anomaly detection system 200 may determine the anomaly detection threshold using a machine learning model. In some embodiments, the machine learning model may be trained by a training system. An example training system 600 is illustrated in FIG. 6. The training system 600 may be implemented at the edge device 130, the cloud platform 102, and/or other components of the system 100. In some embodiments, various components of the system 100 may collaborate with one another to perform one or more functionalities of the training system 600 described herein.

As depicted in FIG. 6, the training system 600 may include a machine learning model 602 and a feedback computing unit 604. In some embodiments, the machine learning model 602 may be implemented using one or more supervised and/or unsupervised learning algorithms. For example, the machine learning model 602 may be implemented in the form of a linear regression model, a logistic regression model, a Support Vector Machine (SVM) model, and/or other learning models. Additionally or alternatively, the machine learning model 602 may be implemented in the form of a neural network including an input layer, one or more hidden layers, and an output layer. Non-limiting examples of the neural network include, but are not limited to, Convolutional Neural Network (CNN), Recurrent Neural Network (RNN), Long Short-Term Memory (LSTM) neural network, etc. Other system architectures for implementing the machine learning model 602 are also possible and contemplated.

As depicted in FIG. 6, the machine learning model 602 may be trained with a one or more batches 606. The batches 606 may include one or more anomalous batches and/or one or more non-anomalous batches generated by the industrial process that are already finished. During the training process, the training system 600 may input the batches 606 into the machine learning model 602, and determine one or more candidate anomaly detection thresholds using the machine learning model 602.

Figure 7:
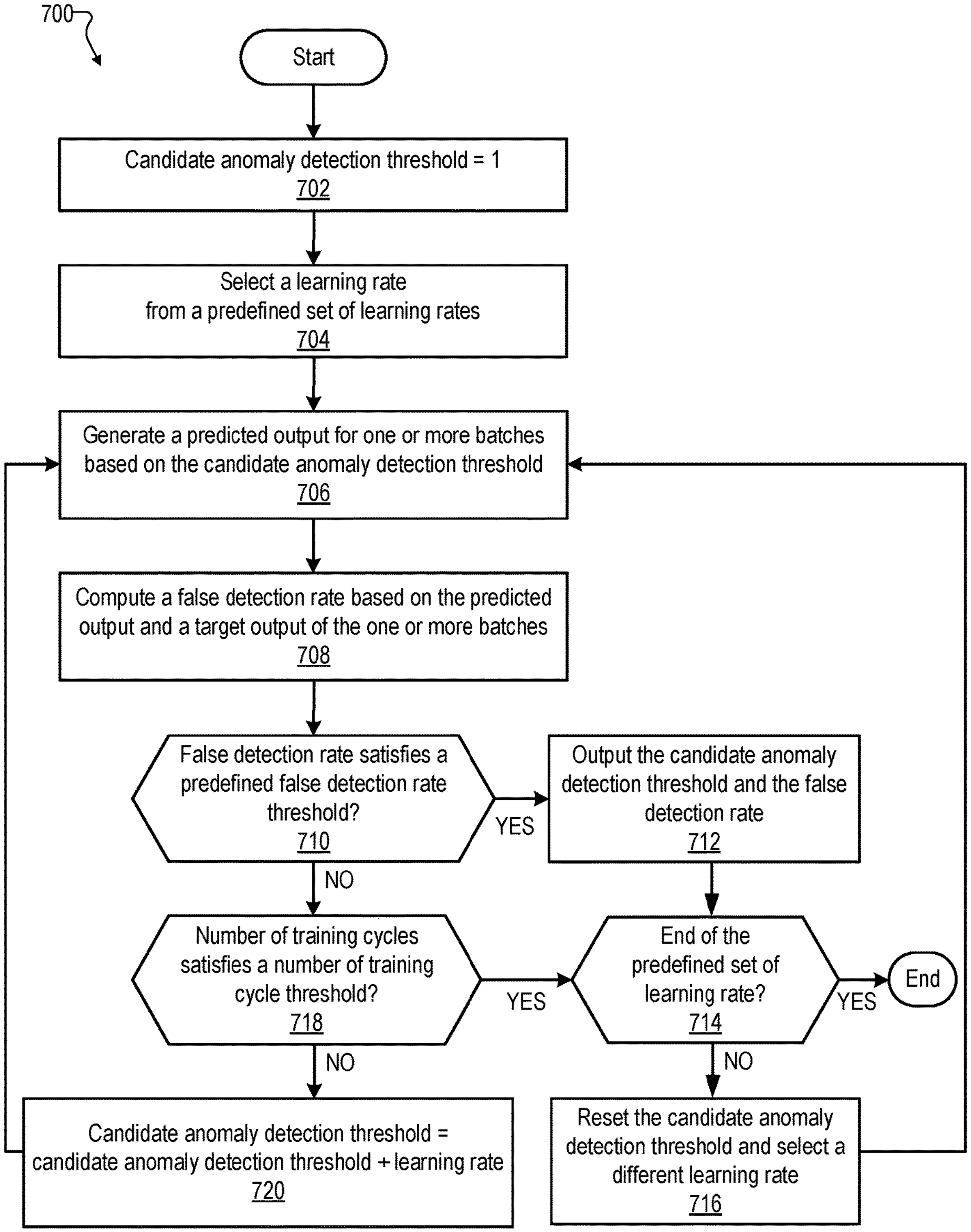
FIG. 7 illustrates an example method for training a machine learning model.

An example method 700 for determining the candidate anomaly detection thresholds using the machine learning model 602 is illustrated in FIG. 7. While FIG. 7 shows illustrative operations according to one embodiment, other embodiments may omit, add to, reorder, and/or modify any of the operations shown in FIG. 7. In some examples, multiple operations shown in FIG. 7 or described in relation to FIG. 7 may be performed concurrently (e.g., in parallel) with one another, rather than being performed sequentially as illustrated and/or described. One or more of the operations shown in FIG. 7 may be performed by a training system such as the training system 600 and/or any implementation thereof. For example, the operations in FIG. 7 may be performed by the machine learning model 602 and the feedback computing unit 604 of the training system 600 depicted in FIG. 6.

At operation 702, the machine learning model 602 may assign the candidate anomaly detection threshold an initial value. For example, the machine learning model 602 may set the initial value of the candidate anomaly detection threshold to be 1.

At operation 704, the machine learning model 602 may select a learning rate from a predefined set of learning rate. The predefined set of learning rate may include one or more learning rates. A learning rate may be positive (e.g., 0.01) or may be negative (e.g., −0.01).

At operation 706, the machine learning model 602 may generate a predicted output for the one or more batches 606 based on the candidate anomaly detection threshold. For each batch 606 among the one or more batches 606, the predicted output may indicate whether the batch 606 is predicted to be anomalous.

In some embodiments, to generate the predicted output, the machine learning model 602 may determine the anomaly metric for each batch 606 among the one or more batches 606. As described herein, the anomaly metric of the batch 606 may be the normalized $T^2$-statistic metric or the normalized Q-statistic metric of the batch 606 that are computed using the PCA model corresponding to entire batch. In some embodiments, the machine learning model 602 may compare the anomaly metric of the batch 606 to the candidate anomaly detection threshold. If the anomaly metric of the batch 606 exceeds the candidate anomaly detection threshold, the machine learning model 602 may determine the predicted output for the batch 606 to be anomalous. If the anomaly metric of the batch 606 does not exceed the candidate anomaly detection threshold, the machine learning model 602 may determine the predicted output for the batch 606 to be non-anomalous. Thus, the predicted output of the one or more batches 606 may indicate whether each batch among the one or more batches 606 is predicted to be anomalous based on the candidate anomaly detection threshold. In some embodiments, the machine learning model 602 may provide the predicted output of the one or more batches 606 to the feedback computing unit 604 as depicted in FIG. 6.

At operation 708, the feedback computing unit 604 may determine a false detection rate based on the predicted output of the one or more batches 606 and a target output of the one or more batches 606. The target output of the one or more batches 606 may indicate whether each batch in the one or more batches 606 is actually anomalous. In some embodiments, to determine the false detection rate based on the predicted output and the target output, the feedback computing unit 604 may determine a number of false positive results where a batch 606 is predicted to be anomalous as indicated in the predicted output generated by the machine learning model 602, but is actually non-anomalous as indicated in the target output of the one or more batches 606. The feedback computing unit 604 may also determine a number of false negative results where a batch 606 is predicted to be non-anomalous as indicated in the predicted output generated by the machine learning model 602, but is actually anomalous as indicated in the target output of the one or more batches 606. The feedback computing unit 604 may then calculate a sum value of the number of false positive results and the number of false negative results, and determine the false detection rate to be a ratio between the sum value and a total number of the batches 606. Thus, the false detection rate may indicate a rate at which the anomaly detection performed for the batches 606 using the candidate anomaly detection threshold is inaccurate.

In some embodiments, the feedback computing unit 604 may provide the false detection rate back to the machine learning model 602. For example, the feedback computing unit 604 may back-propagate the false detection rate to the machine learning model 602 as depicted in FIG. 6. It should be understood that the false detection rate may be determined by the machine learning model 602 instead of the feedback computing unit 604.

At operation 710, the machine learning model 602 may determine whether the false detection rate satisfies a predefined false detection rate threshold (e.g., less than 5%). If the false detection rate satisfies the predefined false detection rate threshold, the machine learning model 602 may determine that the anomaly detection using the candidate anomaly detection threshold is sufficiently accurate. In this case, the method 700 may proceed to operation 712. At operation 712, the machine learning model 602 may output the candidate anomaly detection threshold and the false detection rate associated with the candidate anomaly detection threshold.

At operation 714, the machine learning model 602 may determine whether the machine learning model 602 reaches the end of the predefined set of learning rate. If the end of the predefined set of learning rate is reached, the machine learning model 602 may determine that the machine learning model 602 is already trained with all learning rates included in the predefined set of learning rate, and thus the method 700 may end. On the other hand, if the end of the predefined set of learning rate is not reached, at operation 716, the machine learning model 602 may reset the candidate anomaly detection threshold to 1 and select a different learning rate in the predefined set of learning rate. The method 700 may then return to operation 706 to continue training the machine learning model 602 but with the different learning rate.

If at operation 710, the machine learning model 602 determines that the false detection rate does not satisfy the predefined false detection rate threshold (e.g., less than 5%), the machine learning model 602 may determine that the anomaly detection using the candidate anomaly detection threshold is not sufficiently accurate. In this case, the method 700 may proceed to operation 718.

At operation 718, the machine learning model 602 may determine whether the number of training cycles performed by the machine learning model 602 satisfies a number of training cycle threshold (e.g., equal to or greater than 500 training cycles). If the number of training cycles performed by the machine learning model 602 does not satisfy the number of training cycle threshold, the machine learning model 602 may determine that the machine learning model 602 is not sufficiently trained with the learning rate. In this case, the method 700 may proceed to operation 720.

At operation 720, the machine learning model 602 may adjust the candidate anomaly detection threshold to perform another training cycle with the learning rate. For example, the machine learning model 602 may increase the candidate anomaly detection threshold by an amount equal to the learning rate. The method 700 may then return to operation 706 to perform another training cycle of the machine learning model 602 with the learning rate using the adjusted candidate anomaly detection threshold.

If at operation 718, the machine learning model 602 determines that the number of training cycles performed by the machine learning model 602 satisfies the number of training cycle threshold, the machine learning model 602 may determine that the machine learning model 602 is subjected to a sufficient number of training cycles with the learning rate but does not find a candidate anomaly detection threshold that results in a false detection rate satisfying the predefined false detection rate threshold in these training cycles. In this case, the method 700 may return to operation 714 to determine whether there is a different learning rate to continue training the machine learning model 602 as described above.

Thus, as described in FIG. 7, the machine learning model 602 may be trained with all learning rates in the predefined set of learning rate. For each learning rate, the machine learning model 602 may be trained until a candidate anomaly detection threshold in a training cycle results in a false detection rate satisfying the predefined false detection rate threshold (e.g., less than 5%) or until the machine learning model 602 is subjected to a threshold number of training cycles (e.g., 500 training cycles), whichever occurs first. As a result of the training, the machine learning model 602 may output one or more candidate anomaly detection thresholds that result in one or more false detection rates satisfying the predefined false detection rate threshold (e.g., less than 5%) when these candidate anomaly detection thresholds are used to detect anomaly for the batches 606. In some embodiments, the training system 600 may determine a lowest false detection rate among the one or more false detection rates that satisfy the predefined false detection rate threshold, and identify one or more candidate anomaly detection thresholds that result in the lowest false detection rate. Among the candidate anomaly detection thresholds that result in the lowest false detection rate, the training system 600 may select the lowest candidate anomaly detection threshold to be the anomaly detection threshold.

As described herein, the anomaly detection threshold may be used to determine whether a particular batch is anomalous. For example, if the anomaly metric of the particular batch satisfies the anomaly detection threshold (e.g., the anomaly metric exceeds the anomaly detection threshold), the anomaly detection system 200 may determine that the particular batch is anomalous. In some embodiments, in response to determining that the particular batch is anomalous, the anomaly detection system 200 may display to a process operator (e.g., a human operator) of the industrial process a notification indicating that the particular batch is anomalous. In some embodiments, the anomaly detection system 200 may perform the anomaly detection for multiple complete batches in group. The anomaly detection system 200 may then generate an anomaly detection report including an anomaly detection result for each batch among the multiple complete batches, and provide the anomaly detection report to the process operator. In some embodiments, the anomaly detection system 200 may perform the anomaly detection for multiple complete batches during an off-peak time window.

In some embodiments, the anomaly detection system 200 may not only determine whether a complete batch is anomalous but also determine whether an ongoing batch is anomalous at one or more sample points during the ongoing batch. For example, during a particular batch that is ongoing and not yet finished, when a sample k is collected at a sample point k during the particular batch, the anomaly detection system 200 may determine whether the particular batch is anomalous at the sample point k using the PCA model corresponding to sample point k.

In some embodiments, to determine whether the particular batch is anomalous at the sample point k while the particular batch is ongoing, the anomaly detection system 200 may determine an anomaly metric corresponding to the sample point k during the particular batch. The anomaly metric corresponding to the sample point k during the particular batch may also be referred to as the anomaly metric corresponding to sample point k of the particular batch, the anomaly metric at sample point k of the particular batch, or the anomaly metric of the particular batch at sample point k. As described herein, the anomaly metric of the particular batch at sample point k may be determined using the PCA model corresponding to sample point k.

As described herein, the PCA model corresponding to sample point k may be generated from the non-anomalous batches of the industrial process and may represent a principal component space in which each data point corresponds to a non-anomalous batch and the variance between the data points (the differences between the non-anomalous batches) are better indicated in the principal component space of the PCA model corresponding to sample point k as compared to the original space formed by the initial variables corresponding to the sample data of the non-anomalous batches. In the PCA model corresponding to sample point k, a data point corresponding to a non-anomalous batch may represent a portion of the non-anomalous batch up to the sample point k, and therefore may reflect k samples collected from the start point of the non-anomalous batch up to the sample point k during the non-anomalous batch. As described herein, the PCA model corresponding to sample point k may have the loading matrix $P(k) \in M_{(J*k) \times A}$ and the score matrix $T(k) \in M_{I \times A}$.

In some embodiments, the anomaly detection system 200 may determine the anomaly metric corresponding to sample point k of the particular batch using the loading matrix P(k) and the score matrix T(k) of the PCA model corresponding to sample point k. In some embodiments, the anomaly detection system 200 may generate an input vector x(k) representing the particular batch at the sample point k. The particular batch at the sample point k may include k samples of the particular batch that are collected from the start point of the particular batch up to the sample point k during the particular batch. Each sample may be collected at a sample point between the start point and the sample point k during the particular batch and may include J values of J process variables of the industrial process that are obtained at the sample point. In some embodiments, to generate the input vector x(k) representing the particular batch at the sample point k, the anomaly detection system 200 may identify k samples of the particular batch that are collected from the beginning of the particular batch up to the sample point k during the particular batch, and aggregate k samples in a chronological order of their sample points to form the only row of the input vector x(k). Thus, the input vector x(k) representing the particular batch at the sample point k may have the following dimensions:

$$x(k) \in M_{1\times(J*k)}$$

In some embodiments, the anomaly detection system 200 may determine the anomaly metric corresponding to sample point k of the particular batch that is ongoing in a manner similar to determining the anomaly metric of a batch that is complete as described above. In particular, the anomaly detection system 200 may determine a score t(k), a $T^2$-statistic metric $T^2(k)$, a residual error e(k), a Q-statistic metric Q(k), a confidence limit $$T_\alpha^2(k),$$

a normalized $T^2$-statistic metric $$T_{norm}^2(k),$$

a confidence limit $Q_\alpha(k)$, a normalized Q-statistic metric $Q_{norm}(k)$, and the anomaly metric of the particular batch that correspond to sample point k using Equations 5-17. However, when determining these components corresponding to sample point k for the particular batch, the anomaly detection system 200 may not use the input vector x representing the batch that is complete and may not use the loading matrix P and the score matrix T of the PCA model corresponding to entire batch in Equations 5-17. Instead, the anomaly detection system 200 may use the input vector x(k) representing the particular batch at the sample point k and use the loading matrix P(k) and the score matrix T(k) of the PCA model corresponding to sample point k in Equations 5-17 to determine the anomaly metric corresponding to sample point k of the particular batch.

Accordingly, when determining a first anomaly metric corresponding a first sample point that is at a first time t1 for the particular batch, the anomaly detection system 200 may use a first PCA model corresponding to the first sample point. As described herein, the first PCA model corresponding to the first sample point may be created based on a first batch portion of one or more non-anomalous batches in the industrial process, in which the first batch portion of each non-anomalous batch is generated between a start point of the non-anomalous batch and the first sample point during the non-anomalous batch. On the other hand, when determining a second anomaly metric corresponding a second sample point that is at a second time $t_2$ for the particular batch, the anomaly detection system 200 may use a second PCA model corresponding to the second sample point. As described herein, the second PCA model corresponding to the second sample point may be created based on a second batch portion of the non-anomalous batches in the industrial process, in which the second batch portion of each non-anomalous batch is generated between the start point of the non-anomalous batch and the second sample point during the non-anomalous batch. If the second sample point is subsequent the first sample point in the batch duration, the second batch portion of each non-anomalous batch may include the first batch portion of the non-anomalous batch and also include one or more samples that are generated between the first sample point and the second sample point during the non-anomalous batch.

According to Equation 17, when determining the anomaly metric corresponding to sample point k of the particular batch in which the particular batch is ongoing, the anomaly detection system 200 may select the highest value between the normalized $T^2$-statistic metric corresponding to sample point k $$(T_{norm}^2(k))$$

of the particular batch and the normalized Q-statistic metric corresponding to sample point k ($Q_{norm}(k)$) of the particular batch to be the anomaly metric of the particular batch at sample point k. Similar to the $T^2$-statistic metric and the Q-statistic metric of a batch that is complete, the $T^2$-statistic metric corresponding to sample point k ($T^2(k)$) and the Q-statistic metric corresponding to sample point k (Q(k)) of the particular batch that is ongoing may indicate 2 types of variance of the data point corresponding to the particular batch in the PCA model (in this case, such variance is the variance of the data point corresponding to the particular batch at sample point k in the PCA model corresponding to sample point k). Thus, according to Equation 17, the anomaly detection system 200 may select, between the normalized $T^2$-statistic metric corresponding to sample point k $$(T_{norm}^2(k))$$

of the particular batch and the normalized Q-statistic metric corresponding to sample point k ($Q_{norm}(k)$) of the particular batch, the normalized metric that indicates the larger amount of variation to be the anomaly metric corresponding to sample point k of the particular batch. In other words, the normalized metric that better indicates the variance between the data point corresponding to the particular batch at sample point k and the data points corresponding to the non-anomalous batches at sample point k in the PCA model corresponding to sample point k, and therefore better indicates the inconformity of the particular batch at sample point k with the PCA model corresponding to sample point k, may be selected as the anomaly metric corresponding to sample point k the particular batch or the anomaly metric of the particular batch at sample point k.

Thus, due to the flexibility in selecting which normalized metric to be the anomaly metric of the particular batch at a sample point, the first anomaly metric of the particular batch at the first sample point may be the normalized $T^2$-statistic metric corresponding to the first sample point of the particular batch, while the second anomaly metric of the particular batch at the second sample point may be the normalized Q-statistic metric corresponding to the second sample point of the particular batch. Alternatively, the first anomaly metric of the particular batch at the first sample point may be the normalized Q-statistic metric corresponding to the first sample point of the particular batch, while the second anomaly metric of the particular batch at the second sample point may be the normalized $T^2$-statistic metric corresponding to the second sample point of the particular batch. The normalized $T^2$-statistic metric corresponding to a sample point of the particular batch may be referred to as the normalized $T^2$-statistic metric of the particular batch at the sample point. Similarly, the normalized Q-statistic metric corresponding to the sample point of the particular batch may be referred to as the normalized Q-statistic metric of the particular batch at the sample point.

In some embodiments, the anomaly detection system 200 may generate a visual representation of the anomaly metric for the particular batch based on the anomaly metric of the particular batch at different sample points. For example, when a sample k is collected at a sample point k while the particular batch is ongoing, the sample k may be considered the most recent sample collected for the particular batch. As described herein, the anomaly detection system 200 may determine the anomaly metric of the particular batch at sample point k. The anomaly detection system 200 may then generate or update the visual representation of the anomaly metric of the particular batch to illustrate the anomaly metric of the particular batch from the start point of the particular batch up to the sample point k. The visual representation of the anomaly metric of the particular batch may indicate the anomaly metric of the particular batch at various sample points between the start point of the particular batch and the sample point k at which the sample k is collected. Accordingly, the visual representation of the anomaly metric of the particular batch may indicate a real-time (or substantially real-time or near real-time) trajectory of the anomaly metric of the particular batch while the batch is being generated by the industrial process.

Figure 8:
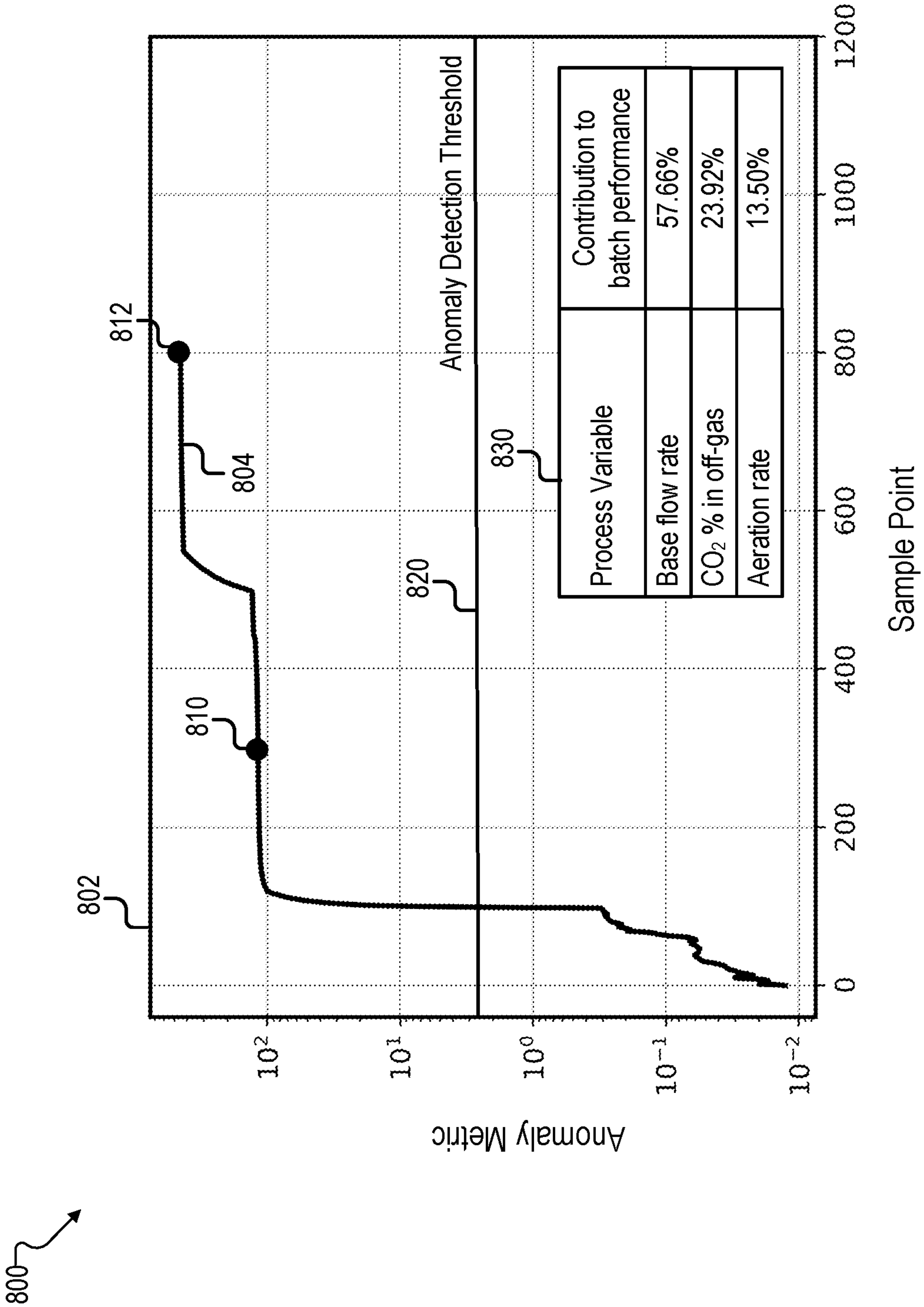
FIG. 8 illustrates an example user interface that provides a visual representation of an anomaly metric for a batch.

FIG. 8 shows an example user interface 800 including a graph 802 that depicts a visual representation 804 of the anomaly metric of the particular batch. As depicted in FIG. 8, the visual representation 804 may be a line graph illustrating the anomaly metric of the particular batch at various sample points since the start point of the particular batch up to the sample point at which the most recent sample of the particular batch is collected. Thus, the visual representation 804 may indicate the trajectory of the anomaly metric of the particular batch in real-time or near real-time (e.g., due to a relatively low amount of delay caused by data collection and processing). As described above, the anomaly metric of the particular batch at a specific sample point may be flexibly selected between the normalized $T^2$-statistic metric of the particular batch at the sample point and the normalized Q-statistic metric of the particular batch at the sample point. Thus, as depicted in FIG. 8, an anomaly metric 810 of the particular batch at the sample point 300 when the sample $300^{th}$ of the particular batch is collected may be the normalized $T^2$-statistic metric of the particular batch at the sample point 300, while an anomaly metric 812 of the particular batch at the sample point 800 when the sample $800^{th}$ of the particular batch is collected may be the normalized Q-statistic metric of the particular batch at the sample point 800. Alternatively, the anomaly metric 810 of the particular batch at the sample point 300 may be the normalized Q-statistic metric of the particular batch at the sample point 300, while the anomaly metric 812 of the particular batch at the sample point 800 may be the normalized $T^2$-statistic metric of the particular batch at the sample point 800.

As depicted in FIG. 8, the graph 802 may also include a threshold line 820 indicating the anomaly detection threshold. As described herein, the anomaly detection threshold may be a predefined threshold value or may be determined based on the machine learning model as described herein with reference to FIGS. 6 and 7. When the visual representation 804 that illustrates the anomaly metric of the particular batch is above the threshold line 820 that indicates the anomaly detection threshold, the anomaly metric of the particular batch may exceed the anomaly detection threshold at one or more sample points in the batch duration, and thus the particular batch may be considered anomalous at these sample points. Thus, the graph 802 that includes the visual representation 804 of the anomaly metric of the particular batch and the threshold line 820 indicating the anomaly detection threshold may facilitate the process operator of the industrial process in monitoring the anomaly of the particular batch in real-time or substantially real-time while the particular batch is being generated by the industrial process.

Accordingly, as described above, when the sample k is collected at the sample point k while the particular batch is ongoing, the anomaly detection system 200 may determine the anomaly metric of the particular batch at sample point k, and determine whether the anomaly metric of the particular batch at sample point k satisfies the anomaly detection threshold. If the anomaly metric of the particular batch at sample point k satisfies the anomaly detection threshold (e.g., the anomaly metric exceeds the anomaly detection threshold), the anomaly detection system 200 may determine that the particular batch at the sample point k, which includes k samples collected from the start point up to the sample point k of the particular batch, does not conform with the PCA model corresponding to sample point k. As described herein, the PCA model corresponding to sample point k may be generated based on a portion of one or more non-anomalous batches, in which the portion of each non-anomalous batch includes k samples collected from the start point up to the sample point k of the non-anomalous batch. As the particular batch at the sample point k does not conform with the PCA model corresponding to sample point k, the anomaly detection system 200 may determine that the particular batch at the sample point k is anomalous or the particular batch is anomalous at the sample point k.

In some embodiments, in response to determining that the particular batch is anomalous at the sample point k, the anomaly detection system 200 may present to the process operator of the industrial process a notification indicating that the particular batch is anomalous at the sample point k. The notification may be an alert notification displayed on the user interface 800 that shows the real-time or near real-time trajectory of the anomaly metric of the particular batch as depicted in FIG. 8. Additionally or alternatively, the notification may be an electronic message being sent to an email address of the process operator, an audio alert that is repeated periodically (e.g., every 2 s) until being manually turned off, and/or other types of notification.

In some embodiments, in response to determining that the particular batch is anomalous at the sample point k, the anomaly detection system 200 may determine a contribution of each process variable of the industrial process to the performance of the particular batch at the sample point k, thereby facilitating the process operator in addressing the anomaly of the particular batch as the particular batch is still ongoing. In some embodiments, to determine the contribution of each process variable to the performance of the particular batch at the sample point k, for each process variable j among J process variables of the industrial process, the anomaly detection system 200 may determine a variable contribution of the process variable j towards the anomaly metric of the particular batch at sample point k. In some embodiments, the variable contribution of the process variable j towards the anomaly metric of the particular batch at sample point k may be the variable contribution of the process variable j towards the pre-normalized anomaly metric (the $T^2$-statistic metric or the Q-statistic metric) of the particular batch at sample point k and may be determined as follows:

$$C(j,k) = b * C_{T^2}(j,k) + (1-b) * C_Q(j,k) \quad \text{(Equation 18)}$$

$$\begin{cases} b = 1 & \text{if anomaly metric} = T^2_{norm}(k) \\ b = 0 & \text{if anomaly metric} = Q_{norm}(k) \end{cases}$$

Thus, according to Equation 18, if the anomaly metric of the particular batch at sample point k is the normalized $T^2$-statistic metric of the particular batch at sample point k $$(T^2_{norm}(k)),$$

the variable contribution of the process variable j towards the anomaly metric of the particular batch at sample point k may be the variable contribution of the process variable j towards the $T^2$-statistic metric of the particular batch at sample point k ($C_{T^2}$(j,k)). On the other hand, if the anomaly metric of the particular batch at sample point k is the normalized Q-statistic metric of the particular batch at sample point k ($Q_{norm}$(k)), the variable contribution of the process variable j towards the anomaly metric of the particular batch at sample point k may be the variable contribution of the process variable j towards the Q-statistic metric of the particular batch at sample point k ($C_Q$(j,k)).

In some embodiments, the anomaly detection system 200 may determine the variable contribution of the process variable j towards the $T^2$-statistic metric of the particular batch at sample point k as follows:

$$C_{T^2}(j,k) = \sum_{a=1}^{A} \left(S^{-1}{}_{k,aa} * t(k)_a * x_{jk} * P(k)_{jk,a}\right) \in R_{1\times 1} \quad \text{(Equation 19)}$$

In Equation 19, A is the number of retained principal components of the PCA model corresponding to sample point k. $S^{-1}{}_{k,aa}$ is the diagonal element $a^{th}$ in the inverse matrix of the covariance matrix S of the score matrix T(k). The covariance matrix S of the score matrix T(k) may be computed as follows:

$$S = \frac{T(k)^T * T(k)}{I-1} \in M_{A\times A} \quad \text{(Equation 20)}$$

In Equation 20, I is the number of non-anomalous batches that are used to generate the PCA model corresponding to sample point k and other PCA models of the industrial process as described herein.

Back to Equation 19, $t(k)_a$ is the element $a^{th}$ of the score t(k). As described herein, the score t(k) may be computed based on the Equation 5 and may have the following dimensions $t(k) \in M_{1\times A}$. In Equation 19, $x_{jk}$ is process variable j among J process variables of the sample k. As described herein, the sample k may be collected at the sample point k during the particular batch and may include J process variables of the industrial process that are obtained at the sample point k. In Equation 19, $P(k)_{jk,a}$ is an element of the loading matrix P(k) that is located at the column a and the row (J*(k−1)+j), which corresponds to the process variable j of the sample k in the column a. As described herein, the loading matrix P(k) may represent the PCA model corresponding to sample point k and may have the following dimensions $P(k) \in M_{(J*k)\times A}$. In some embodiments, the anomaly detection system 200 may determine these components and use these components in Equation 19 to compute the variable contribution of the process variable j towards the $T^2$-statistic metric of the particular batch at sample point k.

In some embodiments, the anomaly detection system 200 may determine the variable contribution of the process variable j towards the Q-statistic metric of the particular batch at sample point k as follows:

$$C_Q(j,k) = \sum_{j=1}^{J} e(k)_{jk}{}^2 \in R_{1\times 1} \quad \text{(Equation 21)}$$

In Equation 21, J is the number of process variables of the industrial process, and e(k) is the residual error corresponding to sample point k of the particular batch. As described herein, the residual error e(k) may be computed based on the Equation 7 and may have the following dimensions $e(k) \in M_{1\times Jk}$. In Equation 21, $e(k)_{jk}$ is an element located at column (J*(k−1)+j) of the residual error e(k), which corresponds to the process variable j of the sample k in the residual error e(k). In some embodiments, the anomaly detection system 200 may determine $e(k)_{jk}$ and use this component in Equation 21 to compute the variable contribution of the process variable j towards the Q-statistic metric of the particular batch at sample point k.

Thus, the anomaly detection system 200 may use one or more equations among Equations 18-21 to determine the variable contribution of each process variable of the industrial process towards the anomaly metric of the particular batch at sample point k, depending on whether the anomaly metric of the particular batch at sample point k is the normalized $T^2$-statistic metric of the particular batch at sample point k $$(T^2_{norm}(k))$$

or the normalized Q-statistic metric of the particular batch at sample point k ($Q_{norm}$(k)).

In some embodiments, once the variable contribution of each process variable towards the anomaly metric of the particular batch at sample point k is determined, the anomaly detection system 200 may select one or more particular process variables of the industrial process based on their variable contribution. For example, for each process variable of the industrial process, the anomaly detection system 200 may compute a percentage (or other types of ratio) between the variable contribution of the process variable towards the anomaly metric of the particular batch at sample point k and a sum of the variable contributions of all process variables towards the anomaly metric of the particular batch at sample point k. This percentage may be referred to as the contribution percentage of the process variable towards the anomaly of the particular batch at sample point k.

In some embodiments, the anomaly detection system 200 may select the one or more particular process variables that have their contribution percentage towards the anomaly of the particular batch at sample point k satisfying a contribution percentage threshold (e.g., more than 35%). Additionally or alternatively, the anomaly detection system 200 may select a predefined number of particular process variables (e.g., 5 process variables) that have the highest contribution percentage towards the anomaly of the particular batch at sample point k among various process variables of the industrial process. These particular process variables may have a significant contribution towards the pre-normalized anomaly metric (the $T^2$-statistic metric or the Q-statistic metric) of the particular batch at sample point k and therefore may be a potential cause for the particular batch being anomalous at the sample point k.

In some embodiments, the anomaly detection system 200 may present, to the process operator of the industrial process, the particular process variables of the industrial process as the potential cause of the particular batch being anomalous at the sample point k. For example, as depicted in FIG. 8, the user interface 800 may include a table 830 indicating the process variables that have the highest contribution towards the particular batch being anomalous at the sample point k. The table 830 may also indicate the contribution percentage of each process variable as depicted in FIG. 8. Accordingly, the process operator may reference the table 830 and identify the process variables that can be adjusted to address the anomaly of the particular batch at the sample point k. As a result, the diagnose and the handling of the anomaly of the particular batch at the sample point k may be facilitated.

In some embodiments, to further facilitate the process operator in addressing the anomaly of the particular batch at the sample point k, for each process variable that is determined to be the potential cause of the anomaly of the particular batch at the sample point k, the anomaly detection system 200 may compute an average value of the process variable in one or more non-anomalous batches of the industrial process. The average value of the process variable in the non-anomalous batches may be the average of one or more values of the process variable that are used when the non-anomalous batches are generated. In some embodiments, the anomaly detection system 200 may present to the process operator a recommendation to adjust the industrial process based on the average value of the process variables in the non-anomalous batches. For example, the anomaly detection system 200 may provide to the process operator the average value of the process variable in the non-anomalous batches, and the process operator may adjust the process variable of the industrial process towards the average value. Additionally or alternatively, the anomaly detection system 200 may compute a difference value between a current value of the process variable that is being used to generate the particular batch and the average value of the process variable in the non-anomalous batches. The anomaly detection system 200 may display to the process operator the difference value, and the process operator may adjust the process variable of the industrial process by a delta amount equal to the difference value.

In some embodiments, instead of or in addition to the recommendation to adjust one or more process variables of the industrial process as described above, the anomaly detection system 200 may provide to the process operator a recommendation to terminate the particular batch before the particular batch is complete. For example, when the anomaly detection system 200 determines that the particular batch is anomalous at the sample point k, the anomaly detection system 200 may determine a time distance between the start point of the particular batch and the sample point k, and calculate a percentage (or other types of ratio) between the time distance and the batch duration. This percentage may be referred to as an anomalous time percentage of the particular batch. In some embodiments, the anomaly detection system 200 may determine whether the anomalous time percentage of the particular batch satisfies a time percentage threshold (e.g., more than 75%). If the anomalous time percentage of the particular batch satisfies the time percentage threshold, the anomaly detection system 200 may determine that the time window between the start point of the particular batch and the sample point k accounts for a significant portion of the particular batch and the particular batch at the sample point k, which includes the samples collected during this time window, is determined to be anomalous. Accordingly, the anomaly detection system 200 may determine that a significant portion of the particular batch is likely unusable due to the anomaly of the particular batch at the sample point k. In this case, the anomaly detection system 200 may generate a recommendation to terminate the particular batch prematurely before the particular batch reaches its end point to avoid further wasting production resources on the particular batch. The anomaly detection system 200 may then provide the recommendation to terminate the particular batch to the process operator for consideration.

In some embodiments, instead of providing the recommendation to address the anomaly of the particular batch or to prematurely terminate the particular batch to the process operator, the anomaly detection system 200 may itself address the anomaly of the particular batch or prematurely terminate the particular batch without human intervention. As an example, to address the anomaly of the particular batch, for each process variable that is determined to be the potential cause of the anomaly of the particular batch at the sample point k, the anomaly detection system 200 may automatically adjust the process variable of the industrial process based on the average value of the process variable in the non-anomalous batches. For example, the anomaly detection system 200 may adjust the process variable of the industrial process to be the average value of the process variable in the non-anomalous batches. As another example, when the anomaly detection system 200 determines that the anomalous time percentage of the particular batch satisfies the time percentage threshold (e.g., more than 75%), the anomaly detection system 200 may automatically terminate the particular batch without waiting for the particular batch to finish at its end point. The anomaly detection system 200 may also perform other operations to address the anomaly of the particular batch or to terminate the particular batch in response to determining that the particular batch is anomalous at a sample point while the particular batch is ongoing.

Embodiments, systems, and components described herein, as well as control systems and automation environments in which various aspects set forth in the present disclosure may be carried out, may include computer or network components such as servers, clients, programmable logic controllers (PLCs), automation controllers, communications modules, mobile computers, on-board computers for mobile vehicles, wireless components, control components and so forth which are capable of interacting across a network. Computers and servers may include one or more processors (e.g., electronic integrated circuits that perform logic operations using electric signals) configured to execute instructions stored in media such as random access memory (RAM), read only memory (ROM), hard drives, as well as removable memory devices (e.g., memory sticks, memory cards, flash drives, external hard drives, etc.).

Similarly, the term PLC or automation controller as used herein may include functionality that can be shared across multiple components, systems, and/or networks. As an example, one or more PLCs or automation controllers may communicate and cooperate with various network devices across the network. These network devices may include any type of control, communications module, computer, Input/Output (I/O) device, sensor, actuator, and human machine interface (HMI) that communicate via the network, which includes control, automation, and/or public networks. The PLC or automation controller may also communicate with and may control other devices such as standard or safety-rated I/O modules including analog, digital, programmed/intelligent I/O modules, other programmable controllers, communication modules, sensors, actuators, output devices, and the like.

The network may include public networks such as the Internet, intranets, and automation networks such as control and information protocol (CIP) networks including DeviceNet, ControlNet, safety networks, and Ethernet/IP. Other networks may include Ethernet, DH/DH+, Remote I/O, Fieldbus, Modbus, Profibus, CAN, wireless networks, serial protocols, etc. In addition, the network devices may include various possibilities (hardware and/or software components). The network devices may also include components such as switches with virtual local area network (VLAN) capability, LANs, WANs, proxies, gateways, routers, firewalls, virtual private network (VPN) devices, servers, clients, computers, configuration tools, monitoring tools, and/or other devices.

To provide a context for various aspects of the present disclosure, FIGS. 20 and 21 illustrate an exemplary environment in which various aspects of the present disclosure may be implemented. While the embodiments are described herein in the general context of computer-executable instructions that can be executed on one or more computers, it should be understood that the embodiments may also be implemented in combination with other program modules and/or implemented as a combination of hardware and software.

The program modules may include routines, programs, components, data structures, etc., that perform particular tasks or may implement particular abstract data types. Moreover, it should be understood that the methods described herein may be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which may be operatively coupled to one or more associated devices.

The exemplary embodiments described herein may also be practiced in distributed computing environments where certain tasks may be performed by remote processing devices that are linked through a communications network. In a distributed computing environment, program modules may be located in both local and remote memory storage devices.

Computing devices may include a variety of media, which may include computer-readable storage media, machine-readable storage media, and/or communications media. Computer-readable storage media or machine-readable storage media may be any available storage media that can be accessed by the computer and may include both volatile and nonvolatile media, removable and non-removable media. By way of example and not limitation, computer-readable storage media or machine-readable storage media may be implemented in connection with any method or technology for storage of information such as computer-readable or machine-readable instructions, program modules, structured data or unstructured data. Computer-readable storage media may be accessed by one or more local or remote computing devices (e.g., via access requests, queries, or other data retrieval protocols) for various operations with respect to the information stored in the computer-readable storage media.

Examples of computer-readable storage media may include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage, or other magnetic storage devices, or other solid state storage devices, or other tangible and/or non-transitory media, which may be used to store desired information. The terms "tangible" or "non-transitory" as applied to storage, memory or computer-readable media herein, should be understood to exclude only propagating transitory signals per se as modifiers and do not relinquish rights to all standard storage, memory, or computer-readable media that are not only propagating transitory signals per se.

Communications media may embody computer-readable instructions, data structures, program modules, or other structured or unstructured data in a data signal such as a modulated data signal (e.g., a carrier wave or other transport mechanism) and may include any information delivery or transport media. The term "modulated data signal" or signals refers to a signal that has one or more of its characteristics set or changed to encode information in one or more signals. By way of example and not limitation, communication media may include wired media (e.g., a wired network or direct-wired connection) and wireless media (e.g., acoustic, RF, infrared, etc.).

Figure 9:
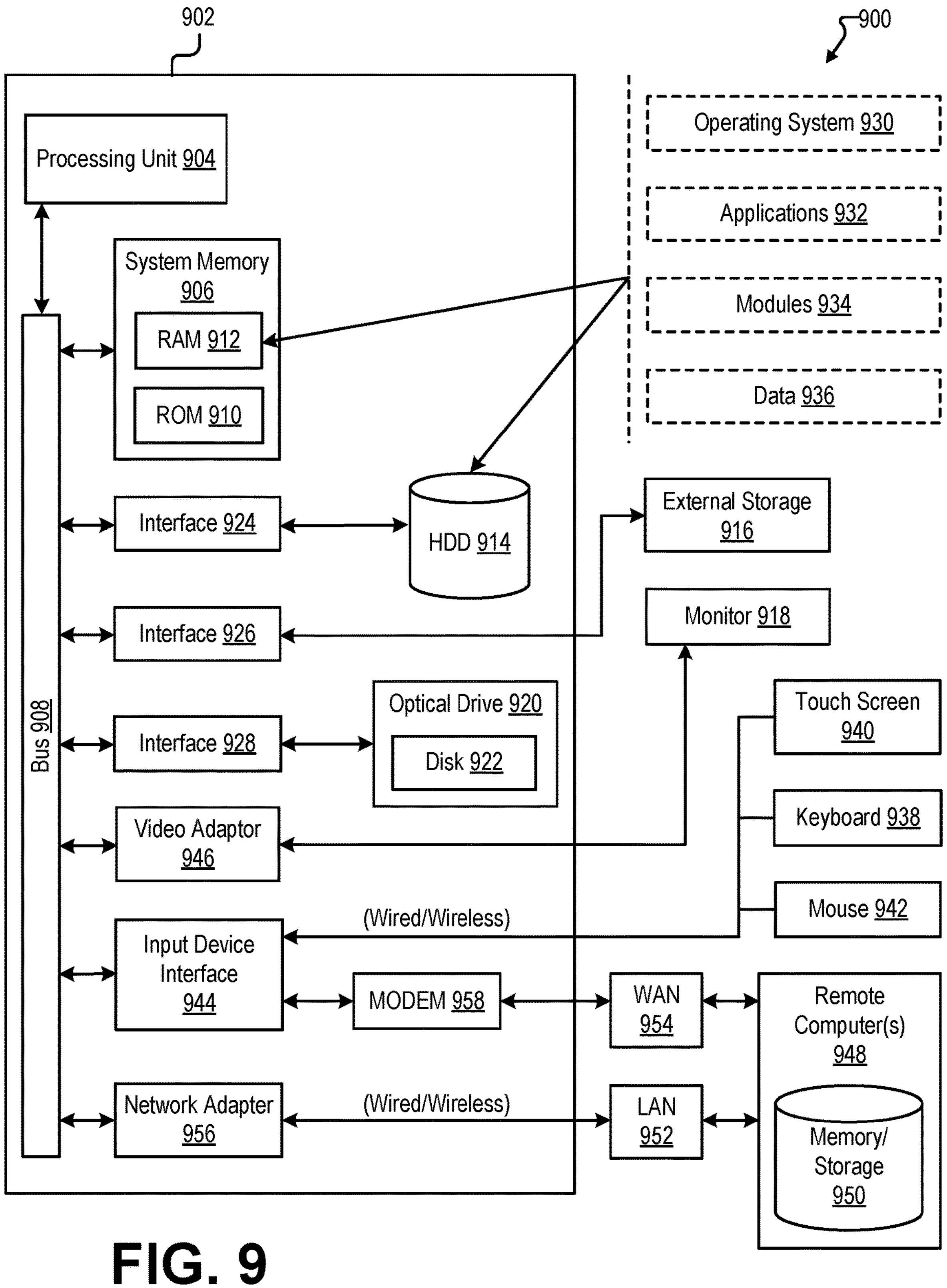
FIG. 9 illustrates an example computing environment.

FIG. 9 illustrates an example environment 900 for implementing various embodiments of the aspects described herein. For example, the environment 900 may implement the system 100, the anomaly detection system 200, the training system 600, and/or other systems and their components described herein. As depicted in FIG. 9, the environment 900 may include a computing device 902. The computing device 902 may include a processing unit 904, a system memory 906, and a system bus 908. The system bus 908 may couple various system components such as the system memory 906 to the processing unit 904. The processing unit 904 may be any commercially available processor. Dual microprocessors and other multi-processor architectures may also be used as the processing unit 904.

The system bus 908 may be a bus structure that can further interconnect to a memory bus (with or without a memory controller), a peripheral bus, and/or a local bus using any commercially available bus architecture. The system memory 906 may include ROM 910 and RAM 912. A basic input/output system (BIOS) may be stored in a non-volatile memory such as ROM, erasable programmable read only memory (EPROM), EEPROM, etc. BIOS may contain the basic routines for transferring information between elements in the computing device 902, such as during startup. The RAM 912 may also include a high-speed RAM such as static RAM for caching data.

The computing device 902 may additionally include an internal hard disk drive (HDD) 914 (e.g., EIDE, SATA), one or more external storage devices 916 (e.g., a magnetic floppy disk drive (FDD), a memory stick or flash drive reader, a memory card reader, etc.), and an optical disk drive 920 (which may read or write from a CD-ROM disc, a DVD, a BD, etc.). While the internal HDD 914 is illustrated as located within the computing device 902, the internal HDD 914 may also be configured for external use in a suitable chassis (not shown). Additionally, while not shown in the environment 900, a solid state drive (SSD) may be used in addition to, or in place of, the HDD 914. The HDD 914, external storage device(s) 916, and optical disk drive 920 may be connected to the system bus 908 by an HDD interface 924, an external storage interface 926, and an optical drive interface 928, respectively. The interface 924 for external drive implementations may include at least one or both of Universal Serial Bus (USB) and Institute of Electrical and Electronics Engineers (IEEE) 1394 interface technologies. Other external drive connection technologies are also possible and contemplated.

The drives and their associated computer-readable storage media may provide nonvolatile storage of data, data structures, computer-executable instructions, etc. In the computing device 902, the drives and storage media may accommodate the storage of any data in a suitable digital format. Although the description of computer-readable storage media above refers to respective types of storage devices, it should be understood that other types of storage media which are readable by a computer, whether presently existing or developed in the future, may also be used in the example operating environment 900, and that any such storage media may contain computer-executable instructions for performing the methods described herein.

A number of program modules may be stored in the drives and RAM 912, including an operating system 930, one or more application programs 932, other program modules 934, and program data 936. All or portions of the operating system 930, the applications 932, the modules 934, and/or the data 936 may also be cached in the RAM 912. The systems and methods described herein may be implemented using various operating systems or combinations of operating systems that are commercially available.

The computing device 902 may optionally include emulation technologies. For example, a hypervisor (not shown) or other intermediary may emulate a hardware environment for the operating system 930, and the emulated hardware may optionally be different from the hardware illustrated in FIG. 9. In such an embodiment, the operating system 930 may comprise one virtual machine (VM) of multiple VMs hosted on the computing device 902. Furthermore, the operating system 930 may provide runtime environments (e.g., the Java runtime environment or the .NET framework) for the application programs 932. The runtime environments may be consistent execution environments that allow application programs 932 to run on any operating system that includes the runtime environment. Similarly, the operating system 930 may support containers, and application programs 932 may be in the form of containers, which are lightweight, standalone, executable packages of software that include code, runtime, system tools, system libraries, settings, and/or other components for executing an application.

In addition, the computing device 902 may be enable with a security module, such as a trusted processing module (TPM). For example, with a TPM, boot components may hash next-in-time boot components, and wait for a match of results to secured values, before loading a next boot component. This process may take place at any layer in the code execution stack of the computing device 902 (e.g., applied at the application execution level or at the operating system (OS) kernel level) thereby enabling security at any level of code execution.

A user may enter commands and information into the computing device 902 through one or more wired/wireless input devices (e.g., a keyboard 938, a touch screen 940, and a pointing device, such as a mouse 942). Other input devices (not shown) may include a microphone, an infrared (IR) remote control, a radio frequency (RF) remote control, or other remote control, a joystick, a virtual reality controller and/or virtual reality headset, a game pad, a stylus pen, an image input device (e.g., one or more cameras), a gesture sensor input device, a vision movement sensor input device, an emotion or facial detection device, a biometric input device (e.g., fingerprint or iris scanner), etc. These input devices and other input devices may be connected to the processing unit 904 through an input device interface 944 that may be coupled to the system bus 908, but may be connected by other interfaces, such as a parallel port, an IEEE 1394 serial port, a game port, a USB port, an IR interface, a BLUETOOTH® interface, etc.

A monitor 918 or other type of display device may be also connected to the system bus 908 via an interface, such as a video adapter 946. In addition to the monitor 918, the computing device 902 may also include other peripheral output devices (not shown), such as speakers, printers, etc.

The computing device 902 may operate in a networked environment using logical connections via wired and/or wireless communications to one or more remote computers, such as remote computer(s) 948. The remote computer(s) 948 may be a workstation, a server computer, a router, a personal computer, portable computer, microprocessor-based entertainment appliance, a peer device, or other common network node. The remote computer(s) 948 may include many or all of the elements in the computing device 902 although only a memory/storage device 950 is illustrated for purposes of brevity. As depicted in FIG. 9, the logical connections of remote computer(s) 948 may include wired/wireless connectivity to a local area network (LAN) 952 and/or to larger networks such as a wide area network (WAN) 954. Such LAN and WAN networking environments may be commonplace in offices and companies, and may facilitate enterprise-wide computer networks (e.g., intranets) all of which may connect to a global communications network (e.g., the Internet).

When used in a LAN networking environment, the computing device 902 may be connected to the local network 952 through a wired and/or wireless communication network interface or adapter 956. The adapter 956 may facilitate wired or wireless communication to the LAN 952, which may also include a wireless access point (AP) disposed thereon for communicating with the adapter 956 in a wireless mode.

When used in a WAN networking environment, the computing device 902 may include a modem 958 or may be connected to a communication server on the WAN 954 via other means to establish communication over the WAN 954, such as by way of the Internet. The modem 958, which may be internal or external and a wired or wireless device, may be connected to the system bus 908 via the input device interface 944. In a networked environment, program modules that are depicted relative to the computing device 902 or portions thereof, may be stored in the remote memory/storage device 950. It should be understood that the network connections depicted in FIG. 9 are merely example and other implementations to establish a communication link between the computers/computing devices are also possible and contemplated.

When used in either a LAN or WAN networking environment, the computing device 902 may access cloud storage systems or other network-based storage systems in addition to, or in place of, the external storage devices 916 as described herein. In some embodiments, a connection between the computing device 902 and a cloud storage system may be established over the LAN 952 or WAN 954 (e.g., by the adapter 956 or the modem 958, respectively). Upon connecting the computing device 902 to an associated cloud storage system, the external storage interface 926 may, with the aid of the adapter 956 and/or the modem 958, manage the storage provided by the cloud storage system as it would for other types of external storage. For example, the external storage interface 926 may be configured to provide access to cloud storage resources as if those resources were physically connected to the computing device 902.

The computing device 902 may be operable to communicate with any wireless devices or entities operatively disposed in wireless communication such as a printer, scanner, desktop and/or portable computer, portable data assistant, communications satellite, any piece of equipment or location associated with a wirelessly detectable tag (e.g., a kiosk, news stand, store shelf, etc.), telephone, etc. This communication may use Wireless Fidelity (Wi-Fi) and BLUETOOTH® wireless technologies. Thus, the communication may be a predefined structure as in a conventional network or simply an ad hoc communication between at least two devices.

Figure 10:
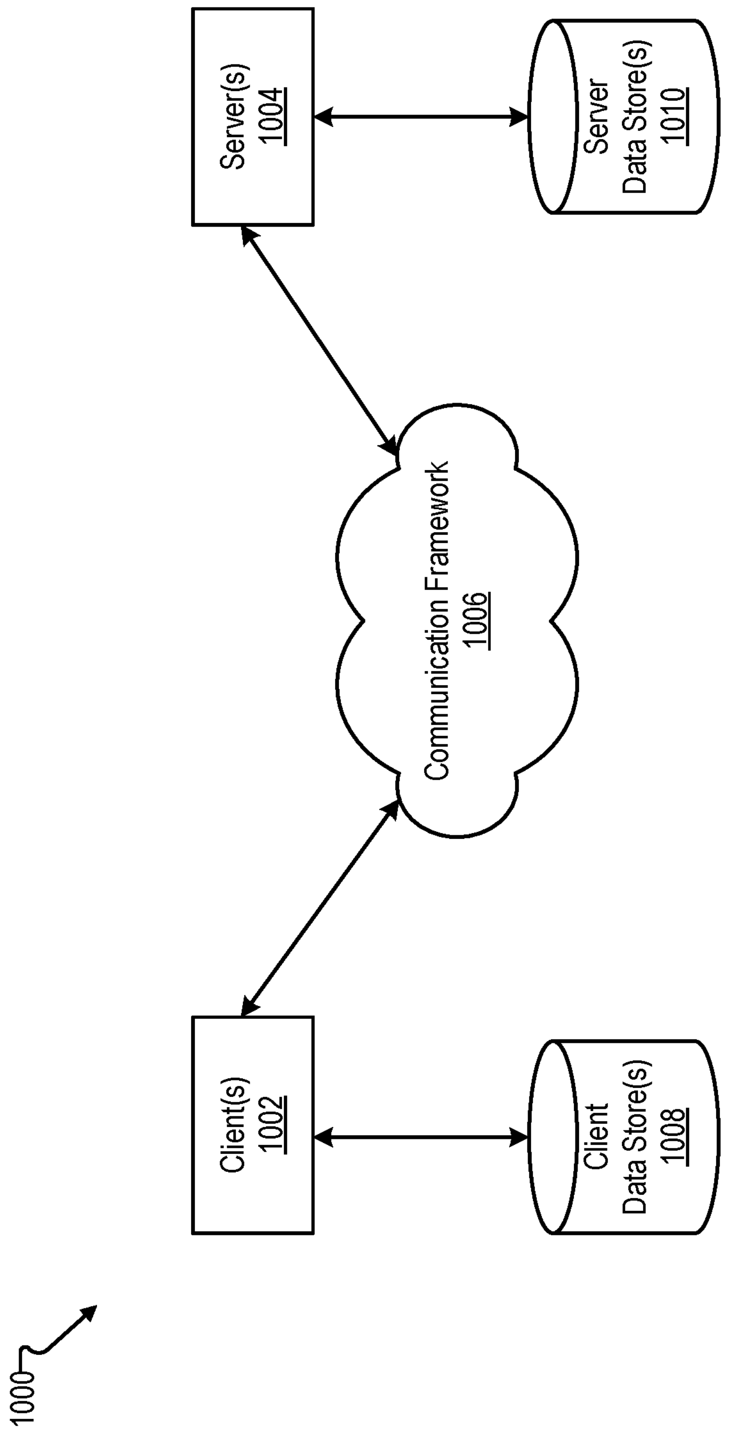
FIG. 10 illustrates an example networking environment.

FIG. 10 illustrates an exemplary computing environment 1000 with which the embodiments described herein may be implemented. The computing environment 1000 may include one or more client(s) 1002. The client(s) 1002 may be hardware and/or software (e.g., threads, processes, computing devices). The computing environment 1000 may also include one or more server(s) 1004. The server(s) 1004 may also be hardware and/or software (e.g., threads, processes, computing devices). For example, the servers 1004 may house threads that implement one or more embodiments described herein. One possible communication between a client 1002 and servers 1004 may be in the form of a data packet adapted to be transmitted between two or more computer processes. The computing environment 1000 may include a communication framework 1006 that may facilitate communications between the client(s) 1002 and the server(s) 1004. The client(s) 1002 may be operably connected to one or more client data store(s) 1008 that may be used to store information local to the client(s) 1002. Similarly, the server(s) 1004 may be operably connected to one or more server data store(s) 1010 that may be used to store information local to the servers 1004.

The foregoing description has been presented for the purposes of illustration and description. It is not intended to be exhaustive or to limit the specification to the precise form disclosed. Many modifications and variations are possible in light of the above teaching. It is intended that the scope of the disclosure is not limited by this detailed description and the modifications and variations that fall within the spirit and scope of the appended claims are included. As will be understood by those familiar with the art, the specification may be embodied in other specific forms without departing from the spirit or essential characteristics thereof.

In particular and with regard to various functions performed by the above-described components, devices, circuits, systems, and/or the like, the terms (including a reference to a "means") used to describe such components are intended to correspond, unless otherwise indicated, to any component which performs the specified function of the described component (e.g., a functional equivalent), even if such component may not be structurally equivalent to the described structure, which illustrates exemplary aspects of the present disclosure. In this regard, it should also be recognized that the present disclosure includes a system as well as a computer-readable medium having computer-executable instructions for performing the acts and/or events of various methods described herein.

In addition, while a particular feature of the present disclosure may have been disclosed with respect to only one of several implementations, such feature may be combined with one or more other features of the other implementations as may be desired and advantageous for a given application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Instead, the use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from a computer-readable device, carrier, or media. For example, computer readable media may include, but are not limited to, magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.).

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A computer-implemented method for anomaly detection of a batch generated by an industrial system executing an industrial process, the method comprising:

determining, by an anomaly detection system and for a batch, a $T^2$-statistic metric and a Q-statistic metric for each of a plurality of principal component analysis (PCA) models associated with the industrial process, wherein each PCA model of the plurality of PCA models:

is based on one or more non-anomalous batches comprising non-anomalous industrial data generated by the industrial system executing the industrial process, and includes the non-anomalous industrial data collected from a start point of the industrial process up to a respective sample point in the industrial process;

determining, by the anomaly detection system for each respective sample point, an anomaly metric of the batch based on the $T^2$-statistic metric and the Q-statistic metric of the batch computed in each corresponding PCA model of the plurality of PCA models;

determining, by the anomaly detection system, that the batch is anomalous based on at least one of the anomaly metrics of the batch; and performing, by the anomaly detection system, an operation in response to determining that the batch is anomalous, wherein performing the operation comprises terminating the batch.

2. The method of claim 1, wherein:

the plurality of PCA models comprises a PCA model for each sample point of the batch, such that a total number of PCA models equals a total number of sample points.

3. The method of claim 1, wherein determining the anomaly metric for each respective PCA model includes:

computing a normalized $T^2$-statistic metric of the batch based on the $T^2$-statistic metric of the batch and a confidence limit of the $T^2$-statistic metric;

computing a normalized Q-statistic metric of the batch based on the Q-statistic metric of the batch and a confidence limit of the Q-statistic metric;

comparing the normalized $T^2$-statistic metric and the normalized Q-statistic metric of the batch; and determining the anomaly metric of the batch based on the comparing.

4. The method of claim 3, wherein determining the anomaly metric for each respective PCA model includes:

determining the anomaly metric of the batch to be a highest value between the normalized $T^2$-statistic metric and the normalized Q-statistic metric of the batch.

5. The method of claim 1, wherein determining that the batch is anomalous includes:

determining that at least one of the anomaly metrics satisfies an anomaly detection threshold.

6. The method of claim 1, further comprising:

determining, by the anomaly detection system, an anomaly detection threshold using a machine learning model.

7. The method of claim 6, wherein the machine learning model is configured to:

generate a predicted output for one or more batches in the industrial process, the predicted output indicating whether a respective batch in the one or more batches is predicted to be anomalous based on a candidate anomaly detection threshold;

determine a false detection rate based on the predicted output and a target output of the one or more batches, the target output indicating whether the respective batch in the one or more batches is actually anomalous;

determine that the false detection rate does not satisfy a predefined false detection rate threshold; and adjust the candidate anomaly detection threshold in response to determining that the false detection rate does not satisfy the predefined false detection rate threshold.

8. The method of claim 7, wherein determining the anomaly detection threshold includes:

determining a lowest false detection rate among one or more false detection rates that satisfy the predefined false detection rate threshold; and determining the anomaly detection threshold to be a lowest candidate anomaly detection threshold among one or more candidate anomaly detection thresholds that result in the lowest false detection rate.

9. The method of claim 1, wherein performing the operation further includes:

presenting, to a process operator of the industrial process, a notification indicating that the batch is anomalous.

10. The method of claim 1, wherein:

the batch is ongoing;

the plurality of PCA models comprises a first PCA model and a second PCA model; and determining the anomaly metric of the batch includes:

determining a first anomaly metric corresponding to a first sample point during the batch using the first PCA model of the industrial process corresponding to the first sample point; and determining a second anomaly metric corresponding to a second sample point during the batch using the second PCA model of the industrial process corresponding to the second sample point.

11. The method of claim 10, wherein:

the first PCA model corresponding to the first sample point is created based on a first batch portion of one or more non-anomalous batches in the industrial process, wherein the first batch portion of a non-anomalous batch is generated between a start point of the non-anomalous batch and the first sample point during the non-anomalous batch; and the second PCA model corresponding to the second sample point is created based on a second batch portion of the one or more non-anomalous batches in the industrial process, wherein the second batch portion of the non-anomalous batch is generated between the start point of the non-anomalous batch and the second sample point during the non-anomalous batch.

12. The method of claim 10, wherein:

the first anomaly metric of the batch is a normalized $T^2$-statistic metric of the batch at the first sample point; and the second anomaly metric of the batch is a normalized Q-statistic metric of the batch at the second sample point.

13. The method of claim 10, further comprising:

generating, by the anomaly detection system, a visual representation of the anomaly metric for the batch based on the first anomaly metric of the batch at the first sample point and the second anomaly metric of the batch at the second sample point.

14. The method of claim 10, wherein determining that the batch is anomalous includes:

determining that the second anomaly metric of the batch at the second sample point satisfies an anomaly detection threshold; and determining, in response to determining that the second anomaly metric of the batch at the second sample point satisfies the anomaly detection threshold, that the batch is anomalous at the second sample point.

15. The method of claim 14, wherein performing the operation includes:

determining, in response to determining that the batch is anomalous at the second sample point, a variable contribution of each process variable of the industrial process towards the second anomaly metric of the batch at the second sample point;

selecting one or more particular process variables of the industrial process based on the variable contribution of the one or more particular process variables; and presenting, to a process operator of the industrial process, the one or more particular process variables of the industrial process as a potential cause of the batch being anomalous at the second sample point.

16. The method of claim 15, wherein performing the operation further includes:

computing, for a particular process variable among the one or more particular process variables, an average value of the particular process variable in one or more non-anomalous batches of the industrial process; and presenting, to the process operator of the industrial process, a recommendation to adjust the industrial process based on the average value of the particular process variable in the one or more non-anomalous batches.

17. The method of claim 14, wherein performing the operation further includes:

determining, in response to determining that the batch is anomalous at the second sample point, a variable contribution of each process variable of the industrial process towards the second anomaly metric of the batch at the second sample point;

selecting one or more particular process variables of the industrial process based on the variable contribution of the one or more particular process variables;

computing, for a particular process variable among the one or more particular process variables, an average value of the particular process variable in one or more non- anomalous batches of the industrial process; and adjusting the particular process variable of the industrial process based on the average value of the particular process variable in the one or more non-anomalous batches.

18. A system comprising:

a memory storing instructions for anomaly detection of a batch generated by an industrial system executing an industrial process; and a processor communicatively coupled to the memory and configured to execute the instructions to:

determine, for the batch, a $T^2$-statistic metric and a Q-statistic metric for each of a plurality of principal component analysis (PCA) models associated with the industrial process, wherein each PCA model of the plurality of PCA models:

is based on one or more non-anomalous batches comprising non-anomalous industrial data generated by the industrial system executing the industrial process, and includes the non-anomalous industrial data collected from a start point of the industrial process up to a respective sample point in the industrial process;

determine, for each respective sample point, an anomaly metric of the batch based on the $T^2$-statistic metric and the Q-statistic metric of the batch computed in each corresponding PCA model;

determine that the batch is anomalous based on at least one of the anomaly metrics of the batch; and perform an operation in response to determining that the batch is anomalous, wherein performing the operation comprises terminating the batch.

19. The system of claim 18, wherein determining the anomaly metric for each respective PCA model includes:

computing a normalized $T^2$-statistic metric of the batch based on the $T^2$-statistic metric of the batch and a confidence limit of the $T^2$-statistic metric;

computing a normalized Q-statistic metric of the batch based on the Q-statistic metric of the batch and a confidence limit of the Q-statistic metric; and determining the anomaly metric of the batch to be a highest value between the normalized $T^2$-statistic metric and the normalized Q-statistic metric of the batch.

20. A non-transitory computer-readable medium storing instructions for anomaly detection of a batch generated by an industrial system executing an industrial process that, when executed, direct a processor of a computing device to:

determine, for the batch, a $T^2$-statistic metric and a Q-statistic metric for each of a plurality of principal component analysis (PCA) models associated with the industrial process, wherein each PCA model of the plurality of PCA models:

is based on one or more non-anomalous batches comprising non-anomalous industrial data generated by the industrial system executing the industrial process, and includes the non-anomalous industrial data collected from a start point of the industrial process up to a respective sample point in the industrial process;

determine, for each respective sample point, an anomaly metric of the batch based on the $T^2$-statistic metric and the Q-statistic metric of the batch computed in each corresponding PCA model;

determine that the batch is anomalous based on at least one of the anomaly metrics of the batch; and perform an operation in response to determining that the batch is anomalous, wherein performing the operation comprises terminating the batch.

* * * * *